(12) United States Patent
Taguchi et al.

(10) Patent No.: US 8,019,164 B2
(45) Date of Patent: Sep. 13, 2011

(54) APPARATUS, METHOD AND PROGRAM PRODUCT FOR MATCHING WITH A TEMPLATE

(75) Inventors: Junichi Taguchi, Sagamihara (JP); Mitsuji Ikeda, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 890 days.

(21) Appl. No.: 12/010,763

(22) Filed: Jan. 29, 2008

(65) Prior Publication Data

US 2008/0205769 A1 Aug. 28, 2008

(30) Foreign Application Priority Data

Jan. 29, 2007 (JP) ................................. 2007-017904
Mar. 22, 2007 (JP) ................................. 2007-075178

(51) Int. Cl.
*G06K 9/68* (2006.01)
(52) U.S. Cl. ........ 382/220; 382/141; 382/145; 382/209; 382/221
(58) Field of Classification Search .................. 382/220
See application file for complete search history.

(56) References Cited

U.S. PATENT DOCUMENTS

| | | | | |
|---|---|---|---|---|
| 5,303,313 | A * | 4/1994 | Mark et al. | 382/235 |
| 5,914,748 | A * | 6/1999 | Parulski et al. | 348/239 |
| 5,969,753 | A * | 10/1999 | Robinson | 348/130 |
| 6,023,530 | A * | 2/2000 | Wilson | 382/219 |
| 6,108,033 | A * | 8/2000 | Ito et al. | 348/152 |
| 6,249,608 | B1 * | 6/2001 | Ikeda et al. | 382/209 |
| 6,640,009 | B2 * | 10/2003 | Zlotnick | 382/224 |
| 6,687,386 | B1 * | 2/2004 | Ito et al. | 382/103 |
| 6,819,778 | B2 * | 11/2004 | Kamei | 382/103 |
| 6,947,587 | B1 * | 9/2005 | Maeda et al. | 382/149 |
| 7,026,615 | B2 * | 4/2006 | Takane et al. | 250/310 |
| 7,235,782 | B2 * | 6/2007 | Takane et al. | 250/310 |
| 2001/0046309 | A1 * | 11/2001 | Kamei | 382/103 |
| 2002/0158199 | A1 * | 10/2002 | Takane et al. | 250/310 |

(Continued)

FOREIGN PATENT DOCUMENTS

JP 63-211474 9/1988

(Continued)

OTHER PUBLICATIONS

Sakai, K., "Basics and Applications of Digital Image Processing by Visual C#.NET & Visual Basic.NET—From Fundemental Concept to Portrait Image Recognition", Sep. 1, 2003, pp. 84-86, Chapter 5 Section 3, CQ Publication Co. Ltd. First Edition.

(Continued)

*Primary Examiner* — Sath V Perungavoor
(74) *Attorney, Agent, or Firm* — McDermott Will & Emery LLP

(57) ABSTRACT

A similar image having a high correlation is selected through autocorrelation performs a template original image selected from an image photographed for a template, and a difference image between the similar image and template original image is formed. An image extracting a real difference is formed by removing noises and edges in unstable areas from the difference image. This image is added to the template original image to form a modified template. Template matching is performed by using the modified template as a template. The image extracting the real reference and added to the modified template functions to add an evaluation penalty to the similar image during matching evaluation to lower an evaluation value of the similar image so that a probability of erroneously recognizing the similar image as the image to be detected.

26 Claims, 20 Drawing Sheets

U.S. PATENT DOCUMENTS

| | | | |
|---|---|---|---|
| 2003/0173516 A1* | 9/2003 | Takane et al. | 250/310 |
| 2005/0283699 A1* | 12/2005 | Nomura et al. | 714/746 |
| 2007/0165936 A1* | 7/2007 | Yonezawa et al. | 382/136 |
| 2008/0205769 A1* | 8/2008 | Taguchi et al. | 382/209 |

FOREIGN PATENT DOCUMENTS

| | | |
|---|---|---|
| JP | 08-077355 | 3/1996 |
| JP | 8-181053 | 7/1996 |
| JP | 2001-351102 | 12/2001 |
| JP | 2004-240909 | 8/2004 |

OTHER PUBLICATIONS

Japanese Office Action issued in Japanese Patent Application No. 2007-017904, mailed May 26, 2011.

* cited by examiner

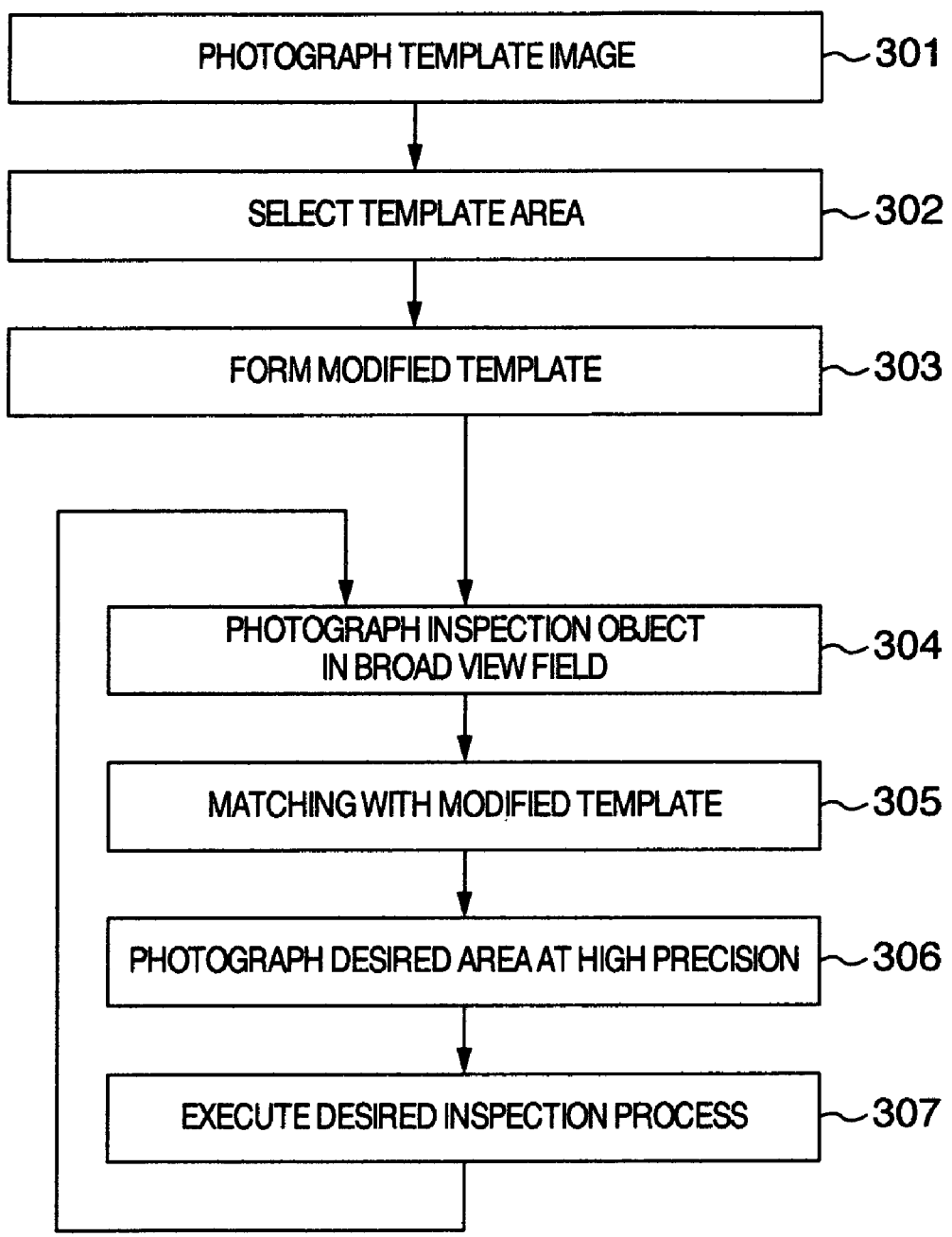

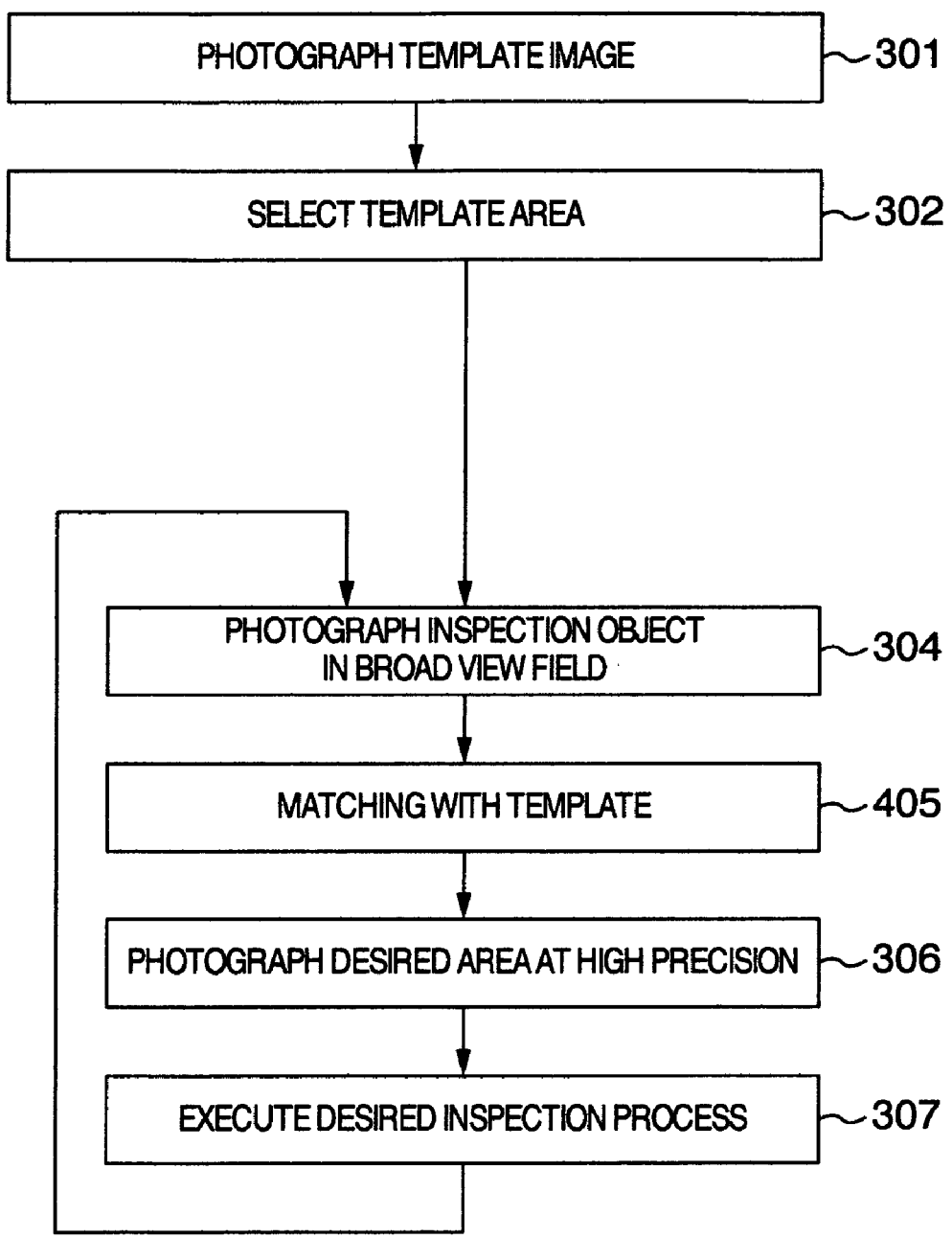

APPARATUS, METHOD AND PROGRAM PRODUCT FOR MATCHING WITH A TEMPLATE

CLAIM OF PRIORITY

The present application claims priorities from Japanese applications Serial No. 2007-075178 filed on Mar. 22, 2007 and Serial No. 2007-017904 filed on Jan. 29, 2007, the contents of which are hereby incorporated by reference into this application.

BACKGROUND OF THE INVENTION

1. Field of the Invention

The present invention relates to a template matching apparatus and method, and more particularly to a template matching apparatus and method which provides a judging function of judging whether an inspection object has the same pattern as that of a template and a position detecting function of detecting a position of the same pattern, and is suitable for utilizing various inspecting apparatus, recognizing apparatus, judging apparatus and the like in which these functions are built in.

2. Description of the Related Art

Techniques called template matching have been used widely. A template is created from an image photographed in advance or data acquired in advance, and a recognizing or judging function of judging whether an inspection object has the same pattern as that of a template or a position detecting function of detecting a position of the same pattern is created.

For example, a fundamental template matching method is described in "Basics and Applications of Digital Image Processing by Visual C#.NET & Visual Basic.NET—From Fundamental Concept to Portrait Image Recognition", by Kouichi SAKAI, CQ Publication Co. Ltd, First Edition, Sep. 1, 2003, Chapter 5, Section 3, pp. 84 to 86. In FIGS. 5 and 6 of this document, (a) a portrait image of a girl is used as an original image, (b) the left eye area is cut as a template, an image obtained by density conversion of the original image is used as an input image, and the results of correlation calculations between each area of the input image and the template are illustratively shown. This document illustrates that (c) only the position of the left eye area cut as the template matches at a correlation coefficient threshold value of 0.99 or higher, and that (d) not only the position of the left eye area but also some candidate positions of the right eye match at a correlation coefficient threshold value of 0.8.

In "Basics and Applications of Digital Image Processing by Visual C#.NET & Visual Basic.NET—From Fundamental Concept to Portrait Image Recognition", by Kouichi SAKAI, CQ Publication Co. Ltd, First Edition, Sep. 1, 2003, since the input image is an image obtained through proper density conversion of the original image, the position having the highest correlation coefficient is at the left eye. Although not described in this document, there is generally a case in which the position having the highest correlation coefficient is not always the position correctly detecting a desired position. For example, if an image of the original image added with a large density change or noises or a portrait image of another person is used as the input image, there is no guarantee that the position of the left eye is the position having the highest correlation coefficient, but there is a possibility that the position of the right eye is the position having the highest correlation coefficient. In such a case, if the position having the highest correlation coefficient is detected as the position of the left eye, a desired position cannot be detected but it is erroneously recognized.

With the above-described template matching techniques, if the detection position of an input image has a pattern deformed greatly from the template or a very similar pattern exists at another position, the position detection becomes erroneous.

Techniques of shortening a matching calculation time is described in JP-A-63-211474, JP-A-2001-351102, and "Basics and Applications of Digital Image Processing by Visual C#.NET & Visual Basic.NET—From Fundamental Concept to Portrait Image Recognition", by Kouichi SAKAI, CQ Publication Co. Ltd, First Edition, Sep. 1, 2003. In JP-A-63-211474, the size, sampling rate and candidate area of the image of a template is reduced hierarchically so that high speed calculations are possible more than if a large size template not reduced hierarchically is used. In "Basics and Applications of Digital Image Processing by Visual C#.NET & Visual Basic.NET—From Fundamental Concept to Portrait Image Recognition", by Kouichi SAKAI, CQ Publication Co. Ltd, First Edition, Sep. 1, 2003, it is described that if subtraction and normalization of average values of a binarized image can be omitted, a "distance" is used as an evaluation formula to shorten a calculation time and speed up processing. JP-A-2001-351102 describes that if a recognition object has a relatively simple shape, a circle having as its diameter a width of a circumscribed square of the recognition object is used as a template to speed up matching calculations of a binarized image.

JP-A-8-181053 describes a method of preventing erroneous recognition of position alignment suitable for an exposure system for large size liquid crystal displays. According to the techniques described in JP-A-8-181053, an area in a template image where it is known beforehand that many errors occur is masked, a corresponding candidate area of a photographed image (input image) is also masked, and only an area not masked is evaluated by calculations based on a predetermined evaluation formula. It is therefore possible to improve a position detection precision through evaluation excluding an area having a large error.

According to the above-described techniques, in order to suppress erroneous recognition of template matching, an area having a large error is masked to exclude evaluation, as described in JP-A-8-181053. This conventional approach is, however, associated with a problem that a predetermined partial area cannot be masked and erroneous recognition cannot be suppressed sufficiently, if an S/N ratio of a template and a photographed image (input image) is poor, and while matching results of each pixel are processed synthetically, errors are accumulated gradually on the whole image, if a structural portion in the photographed image (input image) is missed accidentally, or if a large error occurs accidentally in an unidentified area such as an area having an unnecessary bump.

Even if a large error occurs inevitably as described above, if it is guaranteed that a partial image similar to the template does not exist at the position other than the correct position in the input image, it is possible to detect a correct position. However, if an image similar to the template exists at another position other than the correct position in the input image, this image is erroneously recognized as another similar image.

SUMMARY OF THE INVENTION

Under the circumstances described above, an object of the present invention is to provide a template matching apparatus and method capable of lowering a probability that another image similar to the temperate existing at a position other than the correct position in the template is erroneously recognized as another similar image.

Further, a real comparison image obtained by photographing an inspection object has generally a morphology change and the like to be caused by noises or a processing precision of the inspection object, and is slightly different from an image photographed as a template image. Therefore, template matching between the real comparison image and the template image may result in erroneous recognition caused by errors. Particularly, when an inspection object having similar structures disposed periodically is photographed and inspected, images of the periodical structures moved by one and two periods are the same as the original image and have only different partial areas, so that there is a high probability that template matching erroneously recognizes the positions moved by one and two periods.

According to the above-described techniques, in order to suppress erroneous recognition of template matching, an area having a large error is masked to exclude evaluation, as described in JP-A-8-181053. However, an image having periodically similar structures does not have a predetermined partial area to be masked as in JP-A-8-181053 so that template matching adopting JP-A-8-181053 is not possible.

Under the circumstances described above, an object of the present invention is to provide a template matching apparatus and method capable of template matching with a low probability of erroneous recognition even for an inspection object having a pattern similar to a template near at the template, such as an image having periodical patterns of the same shape.

The above object of the present invention can be achieved by a template matching apparatus for matching an input image obtained by photographing an inspection object with a template image, comprising: template area selecting means for selecting a template area from an image for a template as a template original image; similar image detecting means for detecting a similar image having a high correlation to the template original image selected by the template area selecting means, from the image for a template; difference image forming means for forming a difference image between the template original image and the similar image; modified template forming means for modifying the template original image so as to incur a penalty to the similar image during evaluation and forming a modified template, in accordance with the difference image; and similarity degree evaluating means for calculating the modified template and a partial image in each area of the input image and evaluating a similarity degree of each area, in accordance with a predetermined evaluation formula.

Further, the above object of the present invention can be achieved by a template matching apparatus for matching an input image obtained by photographing an inspection object with a template image, comprising: template area selecting means for selecting a template area from an image for a template as a template original image; detecting means for detecting a direction and a movement amount of an area near a predetermined area of the template original image selected by the template area selecting means where a similar morphology appears; difference image forming means for forming a difference image between an image obtained by moving the image for a template and the template original image, by referring to the direction and the movement amount; modified template forming means for forming a plurality of difference images by changing a reference method to the direction and the movement amount, and using a synthesized image of the plurality of difference images as a new modified template; threshold value similarity degree evaluating means for performing template matching in accordance with a predetermined evaluation formula, by using as an input image a threshold value detection image obtained by photographing a same area and a same object as the image for a template, and as a template the modified template, to thereby evaluate of a similarity degree of each area; threshold value setting means for setting a threshold value by referring to a highest similarity degree and a second highest similarity degree among similarity degrees of areas obtained by the threshold value similarity degree evaluating means; comparison similarity degree evaluating means for performing template matching to thereby evaluate the similarity degree of each area by using as an input image a comparison image obtained by photographing the inspection object, and as a template the modified template; and judging means for judging whether the comparison image contains an area having a same morphology as the selected template area, in accordance with the similarity degree of each area obtained by the comparison similarity degree evaluating means and the set threshold value.

According to the present invention, it is possible to obtain the advantages that template matching can be performed at a low probability that another similar image is erroneously recognized as the original image even if the another image similar to the template exists in an input image at a position different from the correct position.

Further, according to the present invention, it is possible to obtain the advantages that template matching can be performed at a low erroneous recognition probability even for an inspection object having a pattern similar to a template near at the template, such as an image having periodical patterns of the same shape.

BRIEF DESCRIPTION OF THE DRAWINGS

FIG. 3 is a flow chart illustrating the overall operation of the template matching apparatus of the first embodiment.

FIG. 4 is a flow chart illustrating the overall operation of a conventional template matching apparatus.

DESCRIPTION OF THE EMBODIMENTS

The present invention is characterized in image processing to be executed by the template matching apparatus. Various embodiments are possible. For example, an embodiment of forming hardware dedicated for executing image processing of the present invention, and an embodiment of creating software describing an image processing process and making a general computer execute the software.

When a general computer is used, a storage medium storing the software can be supplied. The software can be executed without designating a specific computer. Therefore, a storage medium storing the software is an important common element to practice the present invention, and is one embodiment of the present invention in which the software becomes an arbitrary component of an assembled object. A storage medium for storing software may be a CD, a DVD, a memory card, an HD, an external storage device connectable and downloadable via the Internet.

Embodiments of the template matching apparatus and method of the present invention will be described in detail with reference to the accompanying drawings.

Figure 2A:
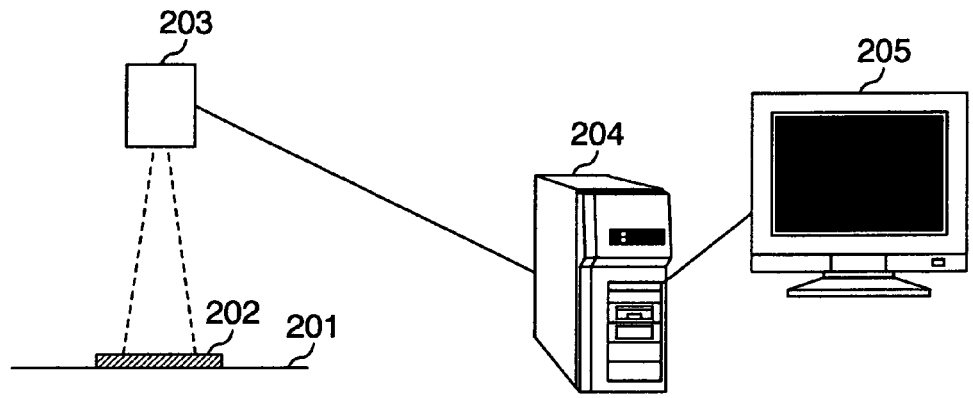
FIGS. 2A and 2B are diagrams showing the overall system configuration of a template matching apparatus and a block diagram showing the structure of a calculation apparatus, according to the first embodiment.
Figure 2B:
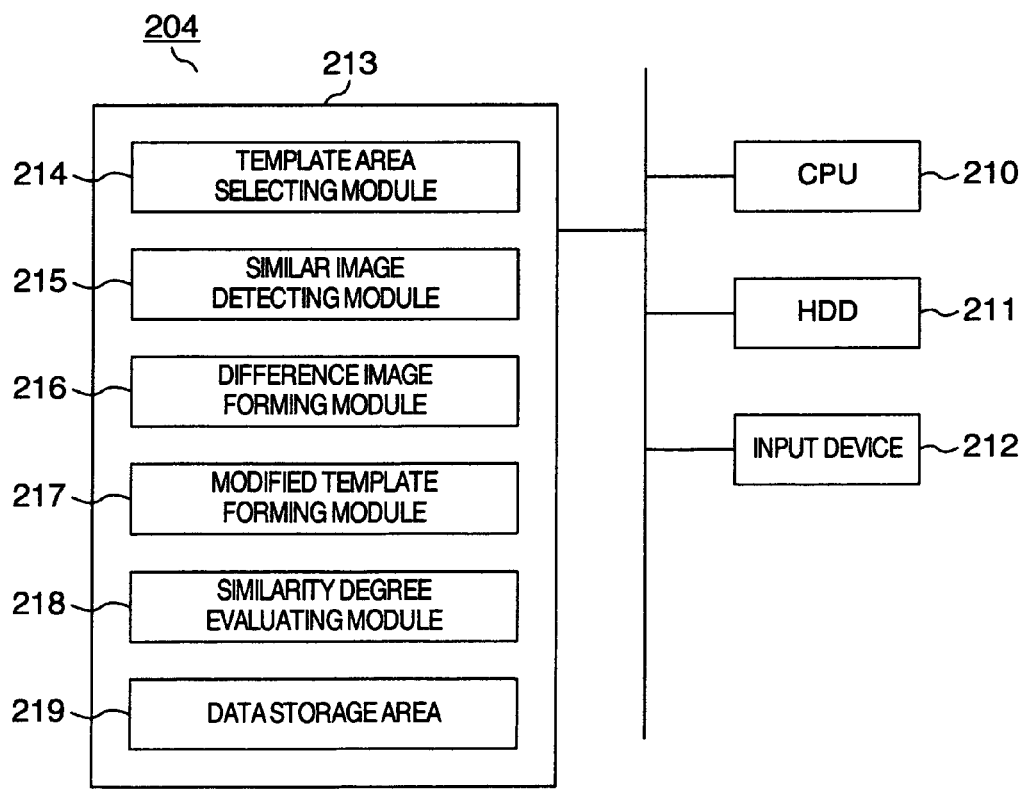

FIGS. 2A and 2B are diagrams showing the overall system configuration of a template matching apparatus and a block diagram showing the structure of a calculation apparatus, according to the first embodiment.

As shown in FIG. 2A, the system of the template matching apparatus is constituted of a stage 201 on which an inspection object 202 is placed, an imaging apparatus 203, a calculation apparatus 204 and a display apparatus 205. The stage 201 is used for placing thereon the inspection object 202 and moving the inspection object 202 to a photographing view field of the imaging apparatus 203. The imaging apparatus 203 photographs the inspection object 202 and transmits a photographed image to the calculation apparatus 204. In order to control the stage 201 and imaging apparatus 203, the calculation apparatus 203 transmits a control signal to the stage 201 and imaging apparatus 203. The calculation apparatus 204 processes an image photographed with the imaging apparatus 203 and displays the processed result on the display apparatus 205. It is not limited to one inspection object 202, but the stage 201 may be controlled to place thereon a plurality of inspection objects and to sequentially feed each inspection object 202 to the photographing view field of the imaging apparatus 203.

The present invention relates to an image processing method to be executed by the calculation apparatus 204, and more particularly, is characterized in that a template modifying process is provided and a matching evaluation formula suitable for the template modifying process is used. Other points may utilize those performed by a conventional inspecting apparatus.

The calculation apparatus 204 may have a well-known structure, and as shown in FIG. 2B is constituted of a CPU 210, a storage device 211 such as a disk on a hard disk drive (HDD), an input device 212 such as a keyboard and a mouse, and a main memory 213. The main memory 213 stores a template area selecting module 214, a similar image detecting module 215, a difference image forming module 216, a modified template forming module 217 and a similarity degree evaluating module 218 respectively constituted of software for executing various processes of the present invention, and has a data storage area 219.

FIG. 3 is a flow chart illustrating the whole operation of the template matching apparatus according to the first embodiment of the present invention. This flow chart will now be described. In the following description, the present invention is applied to detecting a defective circuit pattern from an inspection object, e.g., a circuit board drawn with a number of circuit patterns (there is a possibility that a plurality of similar circuit patterns exist on the circuit board).

(1) First, a flawless inspection object 202 for a template is placed on the stage 201, and photographed with the imaging apparatus 203. A photographed image of the inspection object 202 is sent to the calculation apparatus 204 (Step 301).

(2) Upon reception of the photographed image for a template, the calculation apparatus 204 displays the image on the display apparatus 205, and urges a user to select a template area. The template area selecting module 214 fetches the image of the selected area and stores the image in the data storage area 219 (Step 302).

(3) The similar image detecting module 215 of the calculation apparatus 204 detects a similar image having a high correlation to the image obtained by photographing the template area selected at Step 302, from the image obtained by photographing the inspection object 202 for a template. The difference image forming module 216 forms a difference image between the template original image and the similar image, and the modified template forming module 217 forms a modified template by modifying the template original image in accordance with the difference image so as to make a detected similar image be incurred a penalty upon evaluation (Step 303).

(4) Next, the stage 201 moves the inspection object 202 for a template photographed previously to the outside of the view field of the imaging apparatus 203, and moves a new inspection object 202 to be inspected to the photographing view field of the imaging apparatus 203. The imaging apparatus 203 sends the image obtained by photographing the inspection object to the processing or calculation apparatus 204.

This photographing is made by broad view field photographing having the same view field as that for template photographing, and the photographed image contains in the photographing view field a partial image same as the image of the previously selected template area (Step 304).

(5) The similarity degree evaluating module 218 of the calculation apparatus 204 executes template matching between the modified template formed at Step 303 and the image photographed at Step 304. In this process of template matching, a partial image in each area of the modified template and photographed image are calculated in accordance with a predetermined evaluation formula to evaluate a similarity degree of each area, and the position of the partial image most similar to the template is detected by selecting the partial image having the highest similarity degree. For example, it is possible to use the method described in "Basics and Applications of Digital Image Processing by Visual C#.NET & Visual Basic.NET—From Fundamental Concept to Portrait Image Recognition", by Kouichi SAKAI, CQ Publication Co. Ltd, First Edition, Sep. 1, 2003. The matching evaluation formula may use the formula using "correlation" described in "Basics and Applications of Digital Image Processing by Visual C#.NET & Visual Basic.NET—From Fundamental Concept to Portrait Image Recognition", by Kouichi SAKAI, CQ Publication Co. Ltd, First Edition, Sep. 1, 2003, as well as other various evaluation methods using "sum of products", "square of difference" or the like. The evaluation formula can be properly selected depending upon the characteristics of an image photographing an inspection object, a method of processing a modified template formed in the process at Step 303, and the like (Step 305).

(6) Thereafter, the calculation apparatus 204 calculates photographing parameters and sends the parameters to the imaging apparatus 203. The photographing parameters allow the imaging apparatus 203 to photograph at a high precision an area at a desired position in the photographed image, by using as the origin the matching position obtained through template matching at Step 305. In accordance with the received photographing parameters, the imaging apparatus 203 photographs at a high precision the inspection object 202, and sends the photographed image to the calculation apparatus 204 (Step 306).

(7) The calculation apparatus 204 executes a desired inspection process for the image photographed at a high precision, and displays the results on the display apparatus 205 (Step 307).

FIG. 4 is a flow chart illustrating the whole operation of a template matching apparatus according to prior art. The operation of the conventional template matching apparatus will be described comparing with the operation of the template matching apparatus of the first embodiment described with reference to FIG. 3.

As compared to the operation of the first embodiment shown in FIG. 3, the operation of the conventional template matching apparatus shown in FIG. 4 is different from the first embodiment of the present invention in that Step 303 of forming a modified template is omitted and Step 305 of matching with the modified template is replaced with Step 405 of matching with a template. Other operations are similar to those of the first embodiment. At Step 405 of matching with the template, an image in the area of the template selected at Step 302 of selecting a template area is used as the template, and an evaluation formula suitable for this template is used.

The following formulas (1) to (4) are used as the evaluation formula.

$$Val = \Sigma(T(i,j)-ht)*(G(i,j)-hg))/(|T-ht|\cdot|G-hg|) \qquad (1)$$

Figure 1:
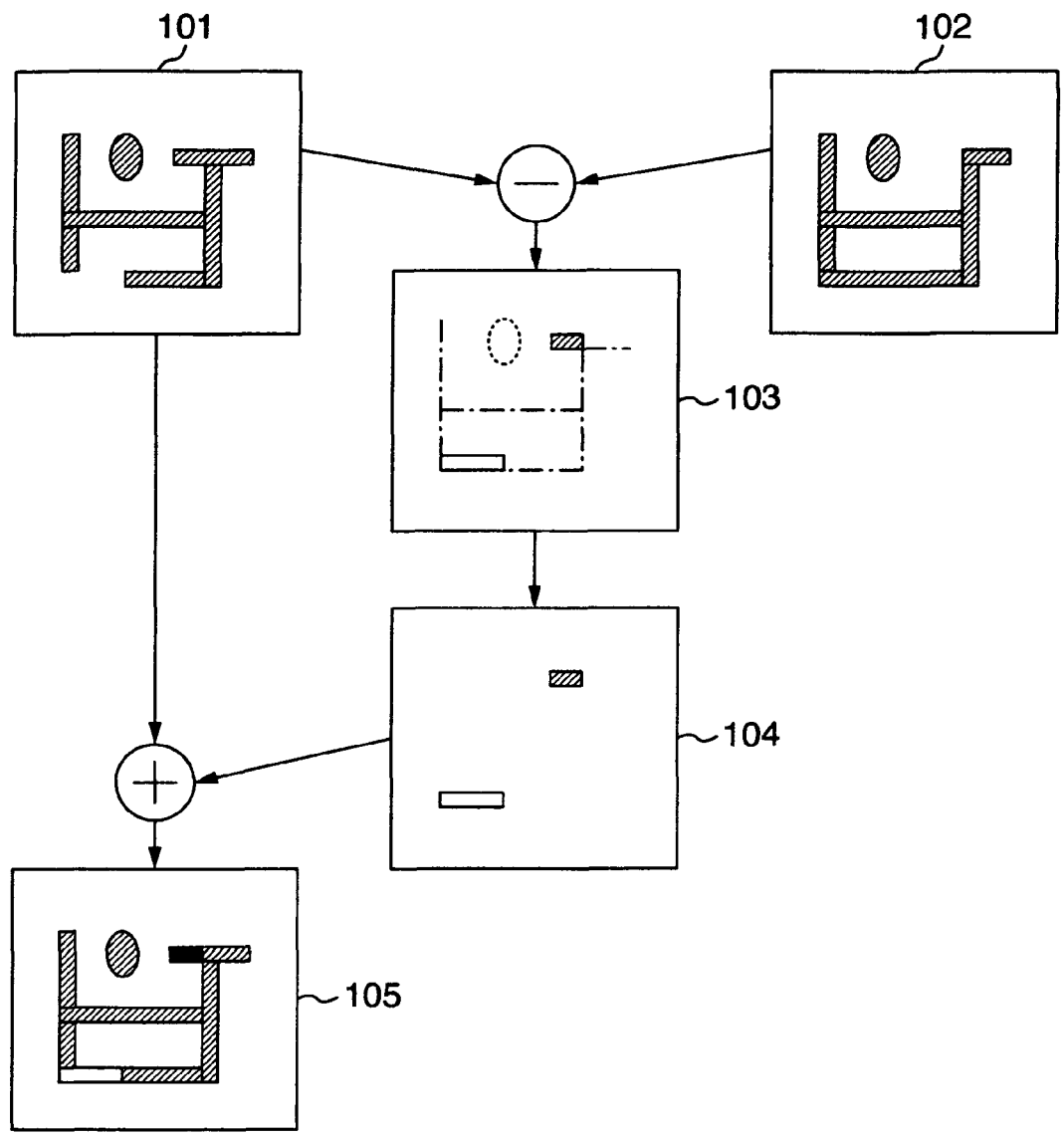
FIG. 1 is a diagram schematically illustrating a process at Step 502 in a flow chart of FIG. 5 according to a first embodiment, which process is the most characteristic process of the first embodiment.

The formula (1) is an evaluation formula using correlation. In the formula (1):

Val represents an evaluation value;

T(i, j) represents a luminance value of a pixel at i-th row and j-th column of a template original image 101 to be described later with reference to FIG. 1 for prior art, or of a modified template 105 for the first embodiment of the present invention;

G(i, j) represents a luminance value of a pixel at i-th row and j-th column of a partial image having the same size as that of the target template and cut from the image photographing the inspection object;

ht represents an average luminance value of the target template, i.e., ht=ΣT(i, j)/(Nx·Ny);

hg represents an average luminance value of the target partial image, i.e., hg=ΣG(i, j)/(Nx·Ny);

|T−ht| represents a magnitude of a difference from the average luminance of the whole target template, i.e., |T−ht|=sqrt(Σ(T(i, j)−ht)*(T(i, j)−ht);

|G−hg| represents a magnitude of a difference from the average luminance of the whole partial image, i.e., |G−hg|=sqrt(Σ(G(i, j)−hg)*(G(i, j)−hg);

sqrt represents square root; and

Σ represents a total sum of all combinations of i-th row and j-th column.

$$Val = \Sigma(T(i,j)*G(i,j)) \qquad (2)$$

The formula (2) is an evaluation formula using sum of products, and uses "distance" in "Basics and Applications of Digital Image Processing by Visual C#.NET & Visual Basic.NET—From Fundamental Concept to Portrait Image Recognition", by Kouichi SAKAI, CQ Publication Co. Ltd, First Edition, Sep. 1, 2003. The meaning of each term of the formula (2) is the same as that of the formula (1).

$$Val = \Sigma(T(i,j)-G(i,j))*(T(i,j)-G(i,j)) \qquad (3)$$

The formula (3) is an evaluation formula using sum of squares of difference. The meaning of each term of the formula (3) is the same as that of the formula (1).

$$Val = \Sigma(T(i,j)-ht-G(i,j)+gt)*(T(i,j)-ht-G(i,j)+gt) \qquad (4)$$

The formula (4) is an evaluation formula using sum of squares of difference from average. The meaning of each term of the formula (4) is the same as that of the formula (1).

Template matching is a process of calculating an evaluation value of each of all partial images capable of being cut, in accordance with a predetermined evaluation formula described above and searching the partial image most similar to the target template. If the evaluation formula uses "correlation" or "sum of products", an image having the highest evaluation value is selected, whereas if the evaluation formula uses "sum of squares of difference" or "sum of squares of difference from average", an image having the lowest evaluation value is selected. In this manner, it becomes possible to search a partial image most similar to the target template.

The outline of the processes has been described above. The feature of the present invention resides in that the modified template forming Step 303 is provided, matching is performed by replacing a conventional template with the modified template, and an evaluation formula suitable for the modified template is selected.

Figure 5:
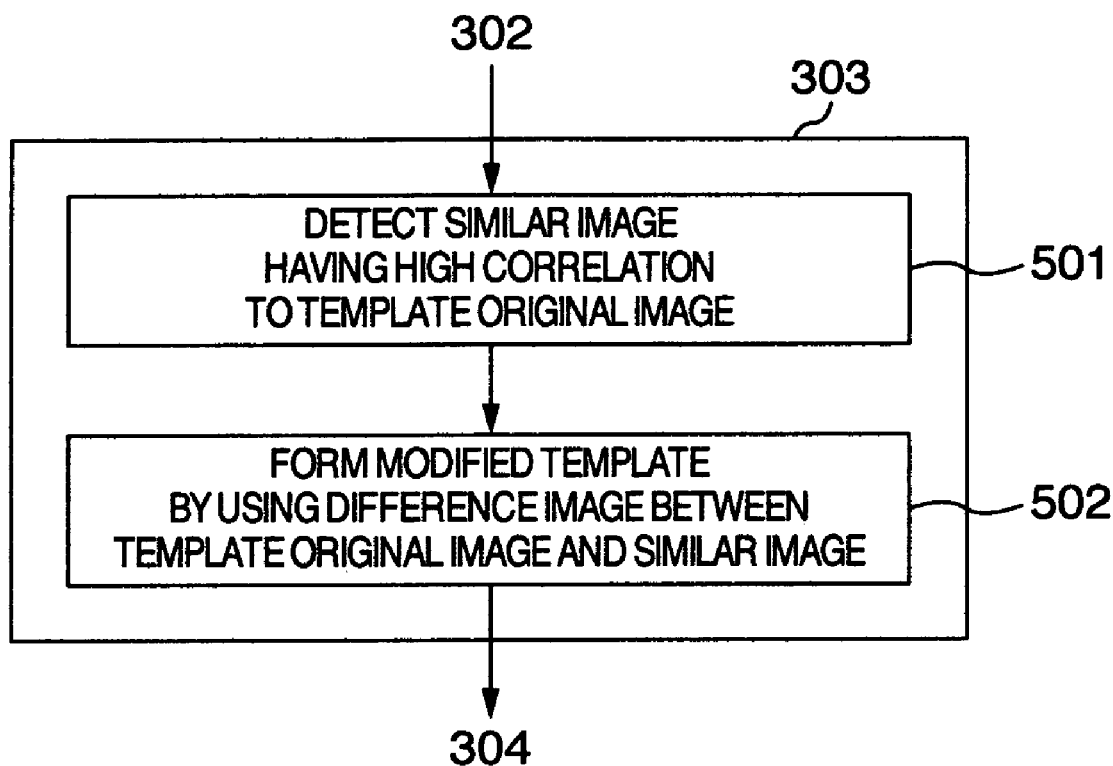
FIG. 5 is a flow chart illustrating the details of a process of forming a modified template at Step 303 in the flow chart of FIG. 3.

FIG. 5 is a flow chart illustrating the process of forming a modified template at Step 303 in the flow chart of FIG. 3. In FIG. 5, the process at Step 303 is divided into Step 501 of detecting a similar image having a high correlation to the template original image and Step 502 of forming a modified template by using a difference image between the template original image and similar image.

The process content of each divided Step will be described specifically. In the following description, reference is made to FIG. 6 showing an image 601 photographed for a template and FIG. 1 schematically illustrating a process at Step 502 in the flow chart of FIG. 5 which process is the most characteristic point of the first embodiment of the present invention.

Figure 6:
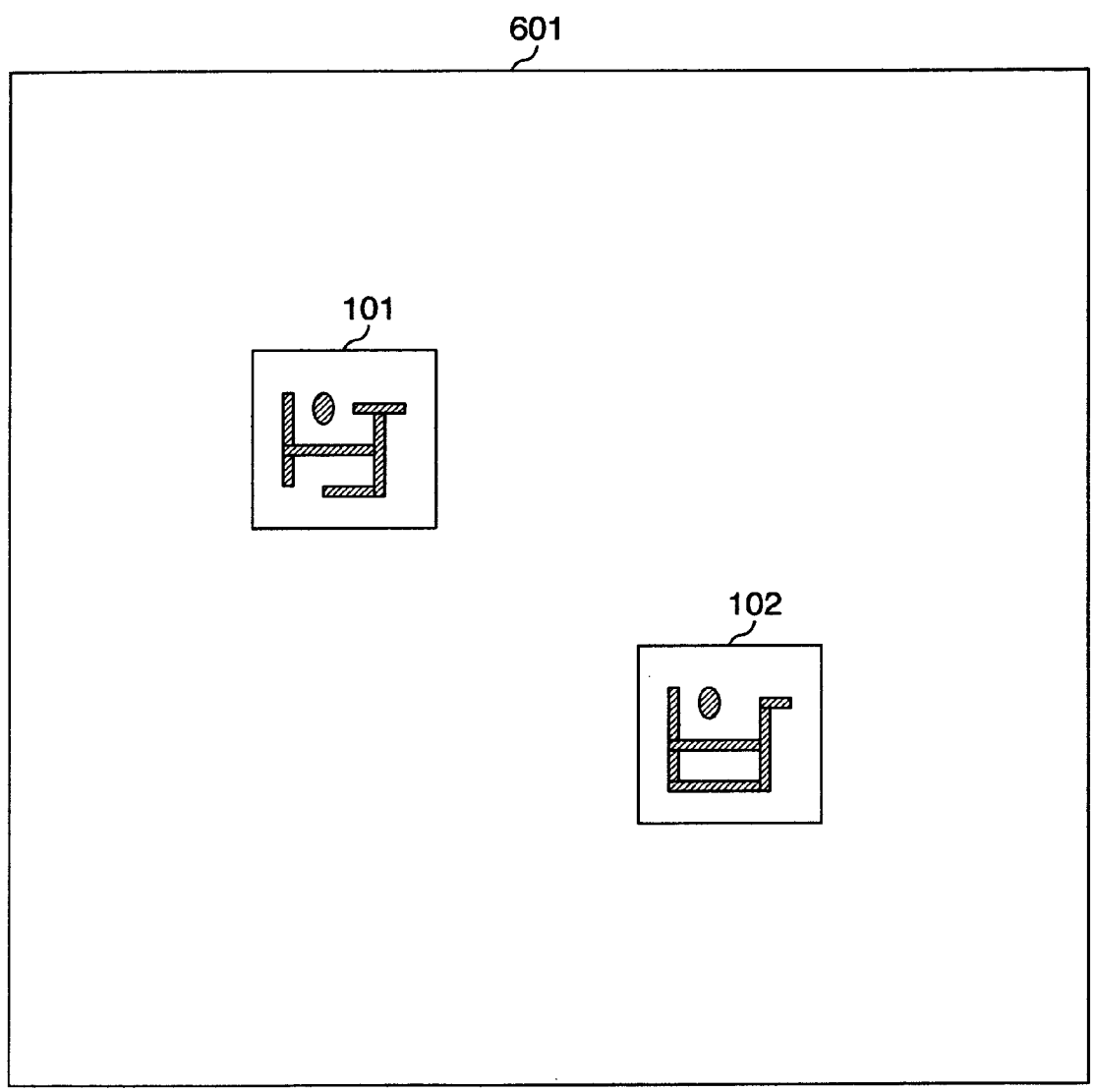
FIG. 6 is a diagram showing an example of an image photographed for a template.

An image 601 shown in FIG. 6 photographed for a template in the process at Step 301 contains a template original image 101 selected as the template area in the process at Step 302. In the process at Step 501, the image 601 itself photographed for a template is used as an input image for template matching, and autocorrelation is performed with the template image 101 to detect a similar image 102 having a next highest correlation value, excepting the position of the template image 101 itself having the highest correlation value, from the image 601 photographed for a template.

Next, description will be made on the process at Step 502 with reference to FIG. 1. First, as shown in FIG. 1, a difference is acquired between the template original image 101 selected in the process at S302 and the similar image 102 selected at Step 501 to form a difference image 103. The difference image includes not only an ideal difference therebetween reflecting only the morphology but also noises, unstable edges caused by fine position shifts, and the like.

Next, the difference image 103 is processed to remove noises and unstable quasi lines in each edge area to form an image 104 extracting an ideal difference therebetween. Noises are eliminated by threshold value processing or the like known conventionally. Unstable quasi lines in edge areas of the difference image 103 are removed in the following manner. First, the template original image 101 and similar image 102 are subjected to a conventionally known edge detecting process to recognize edge areas and set the values of the difference image 103 in the areas recognized as the edge areas to 0. There are various edge detecting processes known conventionally, such as threshold value processing after Laplacian processing. Alternatively, noises and edge area quasi lines are removed and bold lines are detected to form the image 104 extracting a real difference. For example, an average of values in a matrix of 5×5 is calculated, and if the value is equal to or larger than a threshold value, it is assumed that there is a bold line and other values are set to 0, to thereby form the image 104 extracting a real difference. [0042]

Next, the template original image 101 is added to the image 104 extracting the real difference to form a modified template 105.

Addition of the template original image 101 and the image 104 extracting the real difference 104 may be simple addition expressed by the following formula (5).

$$C(i,j)=A(i,j)+B(i,j) \quad (5)$$

In the formula (5),

A(i, j) represents a luminance value of a pixel at i-th row and j-th column of the template original image 101, B(i, j) represents a luminance value of a pixel at i-th row and j-th column of the image 104 extracting the real difference, C(i, j) represents a pixel value obtained by simple addition, and (i, j) represents a position of a target pixel in the image.

The addition of images can be performed by the formula (5) at positions of all pixels of the images. The addition of images may be performed by weighted addition expressed by the following formula (6).

$$C(i,j)=A(i,j)+\alpha \cdot B(i,j) \quad (6)$$

In the formula (6), α is a weight coefficient, and α=1 corresponds to simple addition expressed by the formula (5).

The addition of images is not limited to simple addition described above, but a proper process dependent upon the characteristics of an image of an inspection object may be inserted, for example, a process of performing weighted addition or the like after a process of blurring the image 104 extracting the real difference. Alternatively, in order to grasp the characteristics of an image of an inspection object, samples of the image of an inspection object are prepared beforehand, and a weight providing the least erroneous recognition factor is obtained or an intermediate process is changed to select a process having the least erroneous recognition factor.

As described earlier, the greatest feature of the present invention is to form the modified template 105. In the present invention, by using the modified template, template matching is performed which is described in "Basics and Applications of Digital Image Processing by Visual C#.NET & Visual Basic.NET—From Fundamental Concept to Portrait Image Recognition", by Kouichi SAKAI, CQ Publication Co. Ltd, First Edition, Sep. 1, 2003. A proper matching evaluation formula using "correlation" or "sum of products" is selected in accordance with the characteristics of an image. In the present invention, since the modified template 105 is used which is added with the image 104 extracting the real difference, a penalty is incurred to an evaluation value of a similar image so that it is possible to lower a probability of erroneously recognizing an image as the similar image.

When a calibration term or the like is added to a matching evaluation formula to evaluate a desired position, a quasi formula may be used so as to obtain an evaluation value approximate to that obtained by evaluating a desired portion by using a conventional template. In this case, a parameter value of the calibration term can be determined at a high precision if the same area as that of the template original image 101 is photographed again to obtain a calibration image. For example, for an evaluation formula using "correlation", it is possible to define a formula (a quasi formula with calibration term" as in the following formula (7).

$$Val=(\Sigma(T(i,j)-ht)*(G(i,j)-hg))/(|T0-ht0|\cdot|G-hg|)-K \quad (7)$$

The meaning of this formula (7) is similar to that of the formula (1), and T0, ht0 and K are added to the formula (1). T(i, j) represents a luminance value of a pixel at i-th row and j-th column of the template, i.e., modified template 105, T0 represents the template original image 101, ht0 represents an average of the template original image, i.e., ht0=ΣT0(i, j)/(Nx·Ny), and |T0−ht0| represents a magnitude of a difference from the average luminance of the whole template original image 101, i.e., |T0−ht0|=Σsqrt(Σ(T0(i, j)−ht0)*(T0(i, j)−ht0). Although |T−ht| is used for the general evaluation formula, |T0−ht0| is used for calibration. K is a term added for calibration and is defined by the following formula (8).

$$K=(\Sigma(T(i,j)-ht-T0(i,j)+ht0)*(G(i,j)-hg0))/(|T0-ht0|\cdot|G0-hg0|) \quad (8)$$

In the formula (8), G0 represents the calibration image, G(i, j) represents a luminance value of a pixel in i-th row and j-th column of the calibration image, hg0 represents its average, i.e., hg0=ΣG0(i, j)/(Nx·Ny), and |G0−hg0| represents a magnitude of a difference from the average luminance of the whole calibration image, i.e., |G0−hg0|=Σsqrt(Σ(G0(i, j)−hg0)*(G0(i, j)−hg0)).

If the calibration image G0 is substituted in the formula (7) in place of the photographed image G, the formula (7) becomes a formula indicating "correlation" between the calibration image and template original image 101. It can therefore be understood that if the photographed image is similar to the calibration image, a desired position evaluation value takes a value similar to that of "correlation" using the conventional template original image as the template. Using the "evaluation formula with calibration" provides the advantage that it is possible to judge from a threshold value of an evaluation value similar to the conventional threshold value whether a similar image to the template original image exists. If an image has less noises, the calibration image may not be photographed, but the template original image may be used as the calibration image, to perform similar operations.

Next, description will be made on a template matching apparatus according to the second embodiment of the present invention. The whole system configuration and the structure of the calculation apparatus of the second embodiment are the same as those of the first embodiment shown in FIGS. 2A and 2B. Different points from the first embodiment reside in that although not shown, the main memory 213 of the calculation apparatus stores newly an area extracting module for separating and extracting a background portion and a structural portion of a template image, and stores a similar area extraction data detecting module in place of the similar image detecting module 215, a difference area extraction data forming module in place of the difference image forming module 216, and a modified area extraction template forming module in place of the modified template forming module 217.

The whole operations of the second embodiment are approximately equal to those of the first embodiment described with reference to the flow chart of FIG. 3. With reference to FIG. 3, description will be made on only different points of the second embodiment from the first embodiment.

In the whole operations of the second embodiment of the present invention, the processes at Steps 301, 302, 304, 306 and 307 are the same as those of the first embodiment, the process at Step 303 is divided into Steps 501 and 502 similar to the first embodiment. The process of forming the modified template at Step 502 is different from that of the first embodiment. The different point from the first embodiment resides in that the evaluation formula to be used for template matching at Step 305 between the modified template and a partial image in each area of the photographed image to evaluate a similarity degree is replaced with the evaluation formula suitable for the modified template formed at Step 502 in Step 303.

As described above, the processes at Steps 303 and 305 of the second embodiment are partially different from those of the first embodiment, and other processes are quite the same as those of the first embodiment. The process only at Step 502 divided from Step 303 is different from that of the first embodiment.

Figure 7:
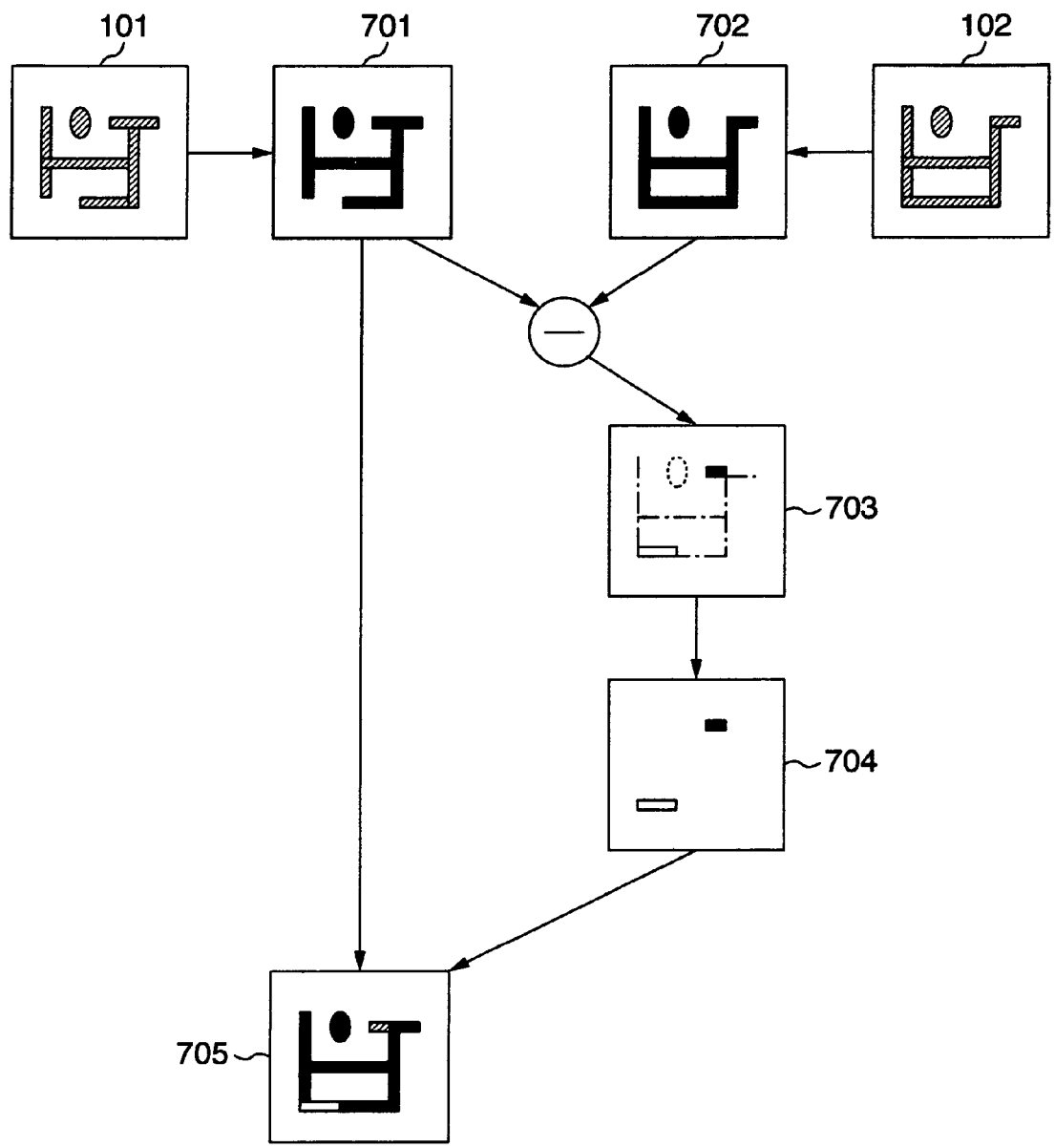
FIG. 7 is a diagram illustrating a process at Step 502 according to a second embodiment of the present invention.

FIG. 7 is a diagram illustrating the process at Step S502 of the second embodiment. This process will now be described.

First, the area extracting module separates and extracts a background portion and a structural portion of an image photographed for a template. This area extraction may use threshold value processing or the like well known conventionally. The area extracting module extracts area extraction data 701 of a template area in the template original image 101 selected in the process at Step 302, and also extracts similar area extraction data 702 of the similar image 102 detected in the process at Step 501.

Next, the difference area extraction data forming module calculates a difference between the area extraction data 701 of the template area and the similar area extraction data 702 to form a difference area extraction data 703. The difference area extraction data 703 includes not only a real difference reflecting only the morphology but also noises, unstable edges caused by fine position shifts, and the like. Similar to the first embodiment, the difference area extraction data is processed to remove noises and unstable quasi lines in each edge area to form an image 704 extracting the real difference. Lastly, the modified area template forming module adds together the area extraction data 701 of the template area and the image 704 extracting the real difference to form a modified area extraction template 705.

As described above, the second embodiment is different from the first embodiment in that the area extraction process at Step 502 separates and extracts the background portion and structural portion of the image photographed for a template and the modified area extraction template 705 is formed from the extraction data obtained by the area extraction process.

Step 305 of the second embodiment performs template matching by using the modified area template 705 formed at Step 502 as the matching template, similar to the first embodiment. If the modified area template 705 is used as the template, it is preferable to use the evaluation formula using "correlation" or "sum of products".

In the second embodiment of the present invention, the area extracting module separates and extracts the background portion and structural portion of the image photographed for a template at the initial stage of Step 502 to form the area extraction data. The area extraction data may be formed before Step 502. For example, the area extraction is performed at Step 302, a template area is selected in accordance with the area extraction data, and correlation is calculated between the data area-extracted at Step 501 and the area extraction data 701 of the template area to thereby detect the similar area extraction data 702.

Next, description will be made on a template matching apparatus according to the third embodiment of the present invention. The whole system configuration and the structure of the calculation apparatus of the third embodiment are the same as those of the first embodiment shown in FIGS. 2A and 2B. Different points from the second embodiment reside in that although not shown, the main memory 213 of the calculation apparatus stores newly a border-added structure recognition data forming module for forming border-added structure recognition data adding a border having a predetermined width between the background portion and structural portion of the area extraction data of the template area, and stores a modified structure recognition template forming module in place of the modified area extraction template forming module.

The whole operations of the third embodiment are approximately equal to those of the first and second embodiments described with reference to the flow chart of FIG. 3. With reference to FIG. 3, description will be made on different points of the third embodiment from the first and second embodiments. The different points of the third embodiment from the first and second embodiments reside in the process at Step 502 and the evaluation formula using "sum of products" to be used in the process at Step 304. Other structures are quite the same as those of the second embodiment.

Figure 8:
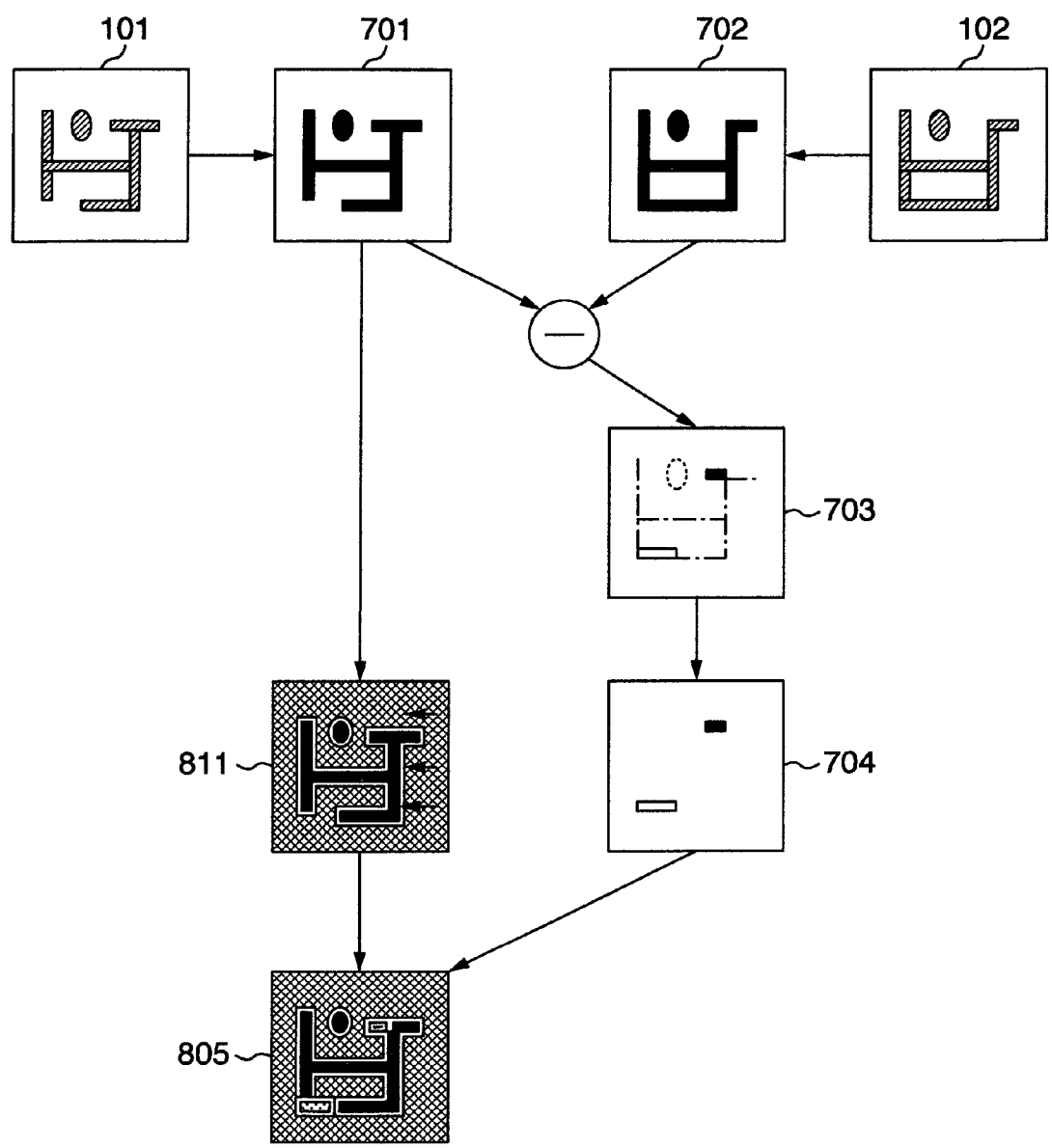
FIG. 8 is a diagram illustrating a process at Step 502 according to a third embodiment of the present invention.

FIG. 8 is a diagram illustrating the process at Step S502 of the third embodiment. This process will now be described.

First, the area extracting module separates and extracts a background portion and a structural portion of an image photographed for a template. The area extracting module extracts area extraction data 701 of a template area in the template original image 101 selected in the process at Step 302, and also extracts similar area extraction data 702 of the similar image 102 detected in the process at Step 501. Next, the difference area extraction data forming module calculates a difference between the area extraction data 701 of the template area and the similar area extraction data 702 to form a difference area extraction data 703. The difference area extraction data is processed to remove noises and unstable quasi lines in each edge area to form an image 704 extracting the real difference. The processes up to this are the same as those of the second embodiment, and the following processes are different from the second embodiment.

Next, the boarder-added structure recognition data forming module forms template area border-added structure recognition data 811 by adding a border having a predetermined width between the background portion and structural portion of the area extraction data 701 of the template area. Thereafter, the modified structure recognition template forming module forms a modified structure recognition template 805 by adding together the border-added structure recognition data 811 and the image 704 extracting the real difference.

As described above, the third embodiment is different from the second embodiment in that at Step 502, a border having a predetermined width is added between the background portion and structural portion of the image photographed for a template to distinguish between the image background portion, structural portion and border, and the modified structure recognition template 805 is formed from the resultant border-added structure recognition data.

Figure 9:
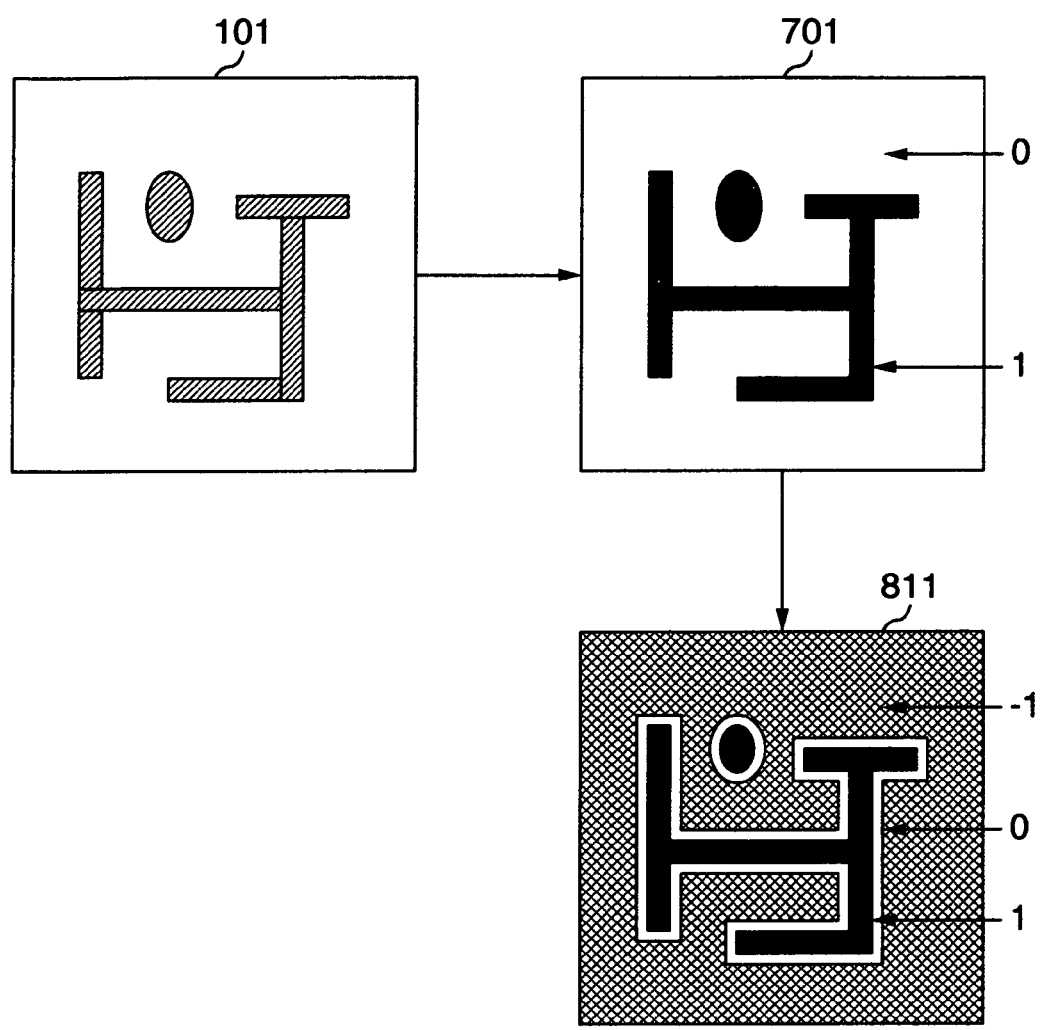
FIG. 9 is an enlarged view showing a template original image of FIG. 8, area extraction data of the template, and border-added structure recognition data of the template.
Figure 10:
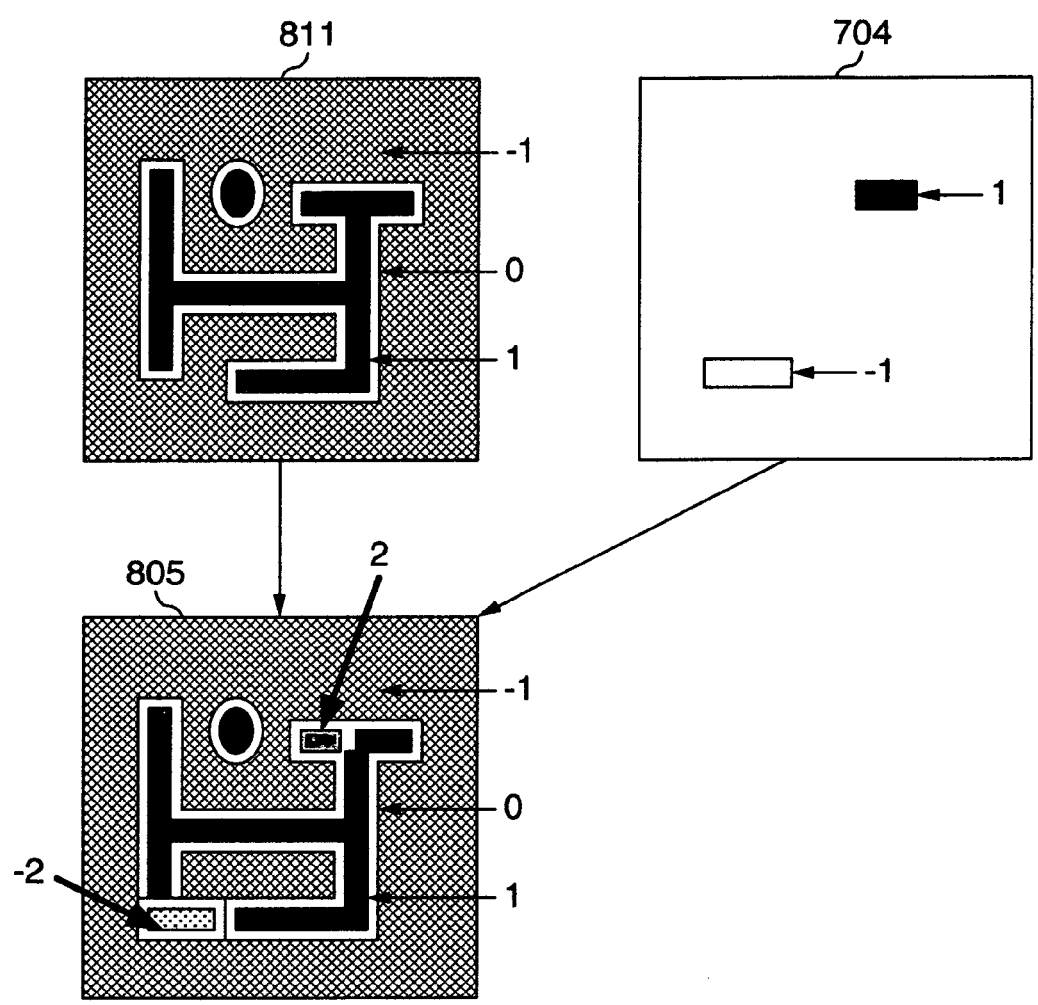
FIG. 10 is an enlarged view of the border-added structure recognition data of the template area, an image extracting the real difference, and a modified structure recognition template, respectively shown in FIG. 8.

FIG. 9 is an enlarged view of the template original image 101, area extraction data 701 of the template area, and border-added structure recognition data 811 of the template area, respectively shown in FIG. 8. FIG. 10 is an enlarged view of the border-added structure recognition data 811 of the template area, image 704 extracting the real difference from the border-added structure recognition data 811, and modified structure recognition template 805, respectively shown in FIG. 8. With reference to FIGS. 9 and 10, description will be made on specific values of the data in the third embodiment of the present invention.

The area extraction data 701 has a value "1" in the area of the extracted structure and a value "−1" in the background portion. The border-added structure recognition data 811 has a value "0" in the area of the border between the structural portion and background portion. Of the image 704 extracting the real difference, an area existing only in the area extraction data 701 of the template area is set to a value "1", and an area existing only in the similar area extraction data 702 is set to a value "−1". By assigning these data values, the values of the final modified structure recognition template 805 have a value "−1" in the background portion, a value "0" in the border area, and a value "1" in the structural area. Therefore, an image can be formed which has a value "2" in the area where only the template-area exists and a value "−2" in the area where only the similar image exists. The peripheral areas assigned "−2" and "2" are regarded as a border area, and a value "0" is assigned to the border area.

Instead of the specific values described above, an image may be formed which has "0" in the border area and predetermined values of opposite signals in the background portion and structural portion, respectively.

In the process at Step 305 of the third embodiment of the present invention, template matching is performed by using the modified structure recognition template 805 formed at Step 502 as a matching template, similar to the first and second embodiment. If the modified structure recognition template 805 is used as the template, it is preferable to use an evaluation formula using "sum of products".

In the third embodiment of the present invention, the area extracting module separates and extracts the background portion and structural portion of the image photographed for a template at the initial stage of Step 502 to form the area extraction data. The area extraction data may be formed before Step 502. For example, the area extraction is performed at Step 302, a template area is selected in accordance with the area extraction data, and correlation is calculated between the data area-extracted at Step 501 and the area extraction data 701 of the template area to thereby detect the similar area extraction data 702.

Each process of each embodiment described above may be realized as programs which can be executed by a CPU of each embodiment. These programs may be supplied by storing them in a storage medium such as FD, CDROM and DVD. These programs may be supplied as digital information via a network.

In the first to third embodiments, although one image having a high correlation to the template original image is selected as the similar image 102, two or more similar images 102 may be selected and difference images 104 extracting the real difference may be sequentially added by performing similar processes to those described above.

As described above, in each embodiment, template matching is performed by forming the modified template emphasizing a difference between the template and similar image. Therefore, as compared to a conventional method using the template as it is, it is possible to reduce a probability of erroneously recognizing an image as an image similar to the template.

In each embodiment described above, a similar image likely to be erroneously recognized as the template is obtained through autocorrelation to the image 601 photographed for a template, like the similar image 102 of each embodiment. A similar image likely to be erroneously recognized as the template may be obtained in various other methods. For example, template matching with an inspection object image is once performed in a manner similar to the conventional manner to collect similar images beforehand or during operation to use the collected similar images as the similar image 102 of each embodiment. If similar images are collected during operation, a difference between the similar image and template is calculated as in each embodiment when a similar image is detected or when similar images are collected by a certain number. In accordance with the difference, a modified template is formed to be replaced by the template original image, to thereby lower an erroneous recognition factor gradually during operations.

Although three embodiments of the present invention have been described, there is another approach different from the approach of the present invention. For example, if the template original image 101 is used as the template as in a conventional process, a probability of erroneously recognizing an image as a similar image becomes high. Instead, in another approach, this disadvantage in a conventional process may be permitted. In this case, although only one similar image is selected in template matching, several candidates are selected, and a correct similar image is determined from the candidates through precise inspection.

If an evaluation formula using "sum of products" is used in such an approach, not only a similar image having the highest evaluation value but also a similar image having the next highest evaluation value are used as candidates. In order to inspect precisely which one is more similar to the template, "sum of products" relative to the image 104 extracting a real difference is calculated to select the similar image having a larger value of "sum of products". Also in this case, an erroneous recognition factor can be lowered as in each embodiment of the present invention. However, in this case, it is necessary to perform precise inspection for each candidate so that the processes in an actual inspection become complicated. There is also an unstable factor in some cases such as how the number of candidates is determined, raising a new issue of limiting the number of candidates capable of obtaining a stable result.

In each embodiment, since template matching is performed by using the modified template 105 as the template, it is not necessary to perform precise inspection for candidates, but simple processes may be used to lower the erroneous recognition factor.

The present invention is applicable to all industrial fields utilizing so-called template matching. In the field of inspection apparatus, the invention is applicable to functions such as position alignment, morphology recognition and distinguishment. For example, the present invention is applicable to circuit pattern inspection, erythrocyte morphology inspection, garbage type distinguishment inspection and the like. In the field of satellite image processing, the present invention is applicable to image recognition support such as distinguishment of building types. The present invention is also applicable to other fields such as a field of automatic driving and driving assistance of notifying a driver of road signs and obstacles through automatic recognition during driving.

Next, the fourth embodiment of the present invention will be described.

Figure 12:
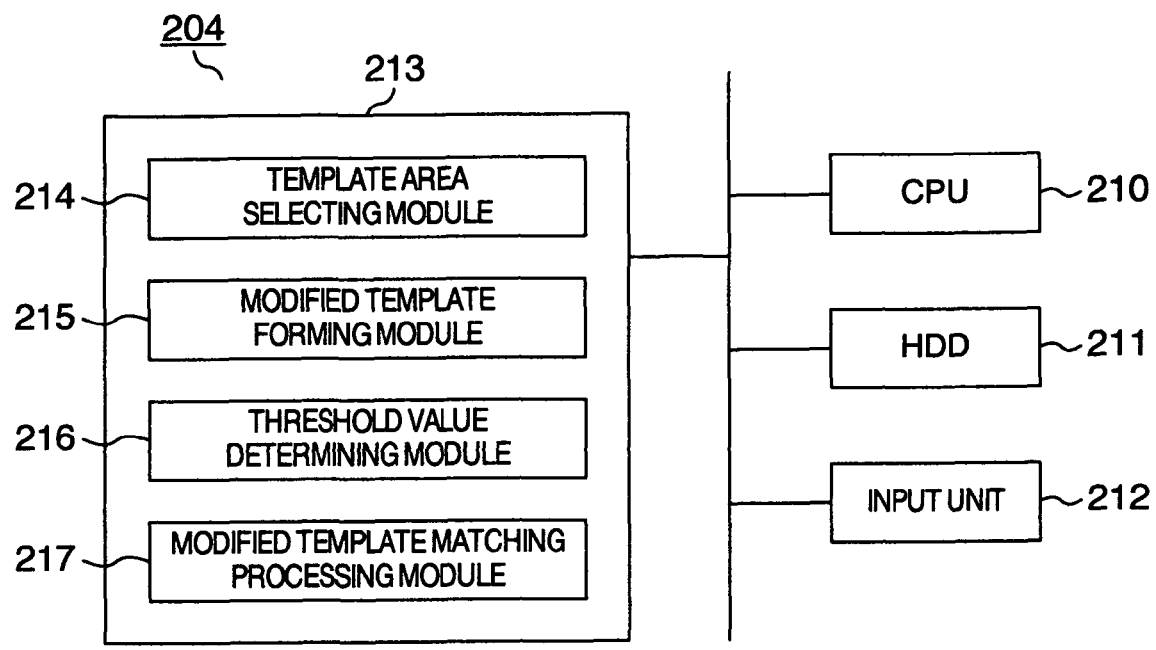
FIG. 12 is a block diagram showing the structure of a calculation apparatus.

The whole system configuration of the fourth embodiment is the same as that shown in FIG. 2A, and the structure of the calculation apparatus is shown in FIG. 12.

The calculation apparatus 204 may have a well known structure, and as shown in FIG. 12 is constituted of a CPU 210, a storage device 211 such as a disk on a hard disk drive (HDD), an input device 212 such as a keyboard and a mouse, and a main memory 213. The main memory 213 stores a template area selecting module 214, a modified template forming module 215, a threshold value determining module 216 and a modified template matching processing module 217.

Figure 13:
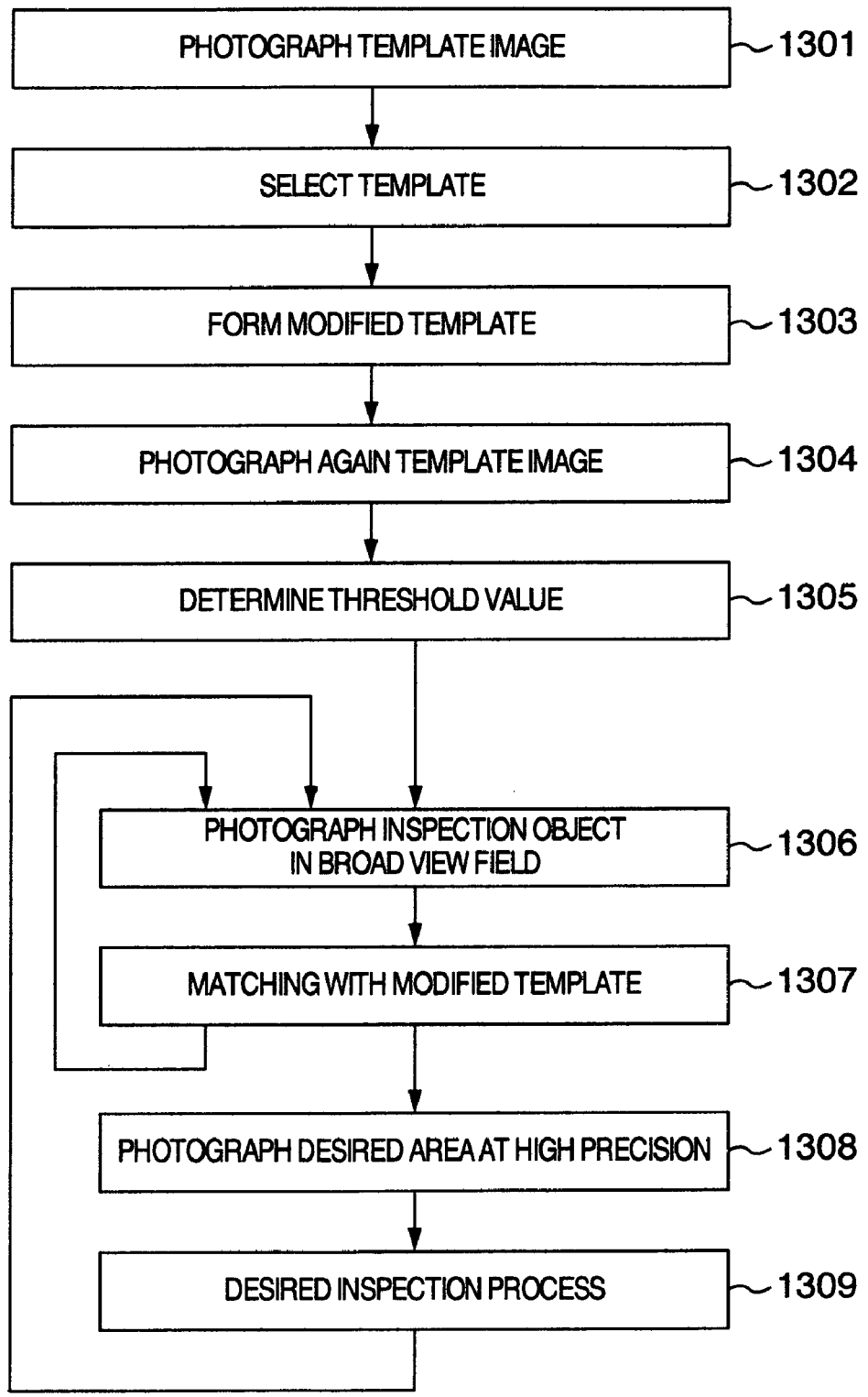
FIG. 13 is a flow chat illustrating the whole operation of a template matching apparatus according to a fourth embodiment of the present invention.

FIG. 13 is a flow chart illustrating the whole operation of the template matching apparatus according to the fourth embodiment of the present invention. This flow chart will now be described. In the following description, the present invention is applied to an inspection object of a circuit board or the like with a number of similar circuit patterns disposed periodically.

(1) First, a flawless inspection object 202 for a template is placed on the stage 201, and photographed with the imaging apparatus 203. A photographed image of the inspection object 202 is sent to the calculation apparatus 204 (Step 1301).

(2) Upon reception of the photographed image for a template, the calculation apparatus 204 displays the image on the display apparatus 205, and urges a user to select a template are. The template area selecting module 214 fetches the image of the selected area and stores the image (Step 1302).

(3) The modified template forming module 215 of the calculation apparatus 204 detects a direction and movement amount of a similar image appearing in a predetermined nearby area of the image (template original image) of the template area selected at Step 1302, forms a difference image between the moved similar image and template by referring to the detected direction and movement amount, and forms and synthesizes a plurality of difference images by changing the reference method to the detected direction and movement amount, to use a synthesized image as a modified template (Step 1303).

(4) The imaging apparatus 203 photographs the same area of the image of the inspection object 202 photographed at Step 1301 at an equal magnification. The photographed image is used as an image for threshold value detection. The same area as the image of the inspection object is photographed again at the equal magnification to obtain an image for threshold value detection, because if the same area of the same inspection object is photographed, different noises and the like may be contained in the image (Step 1304).

(5) The threshold value determining module 216 performs template matching by using as an input image the threshold value detection image photographed at Step 1304 and the modified template formed at Step 1303 as a template. With this template matching, a similarity degree map image can be obtained indicating a similarity degree between each point (each pixel) of the threshold value detection image and the template. The highest similarity degree value and the next highest similarity degree value are obtained from the map image. A threshold value is determined as a calculation result of, e.g., a*0.2+b*0.8 where a is the highest similarity degree value and b is the next highest similarity degree value. This threshold value may be adjusted from the results obtained thereafter, e.g., by using a calculation of a*0.1+b*0.9 (Step 1305).

(6) Thereafter, the stage 201 moves the inspection object 202 photographed previously to the outside of the view field of the imaging apparatus 203, and moves a new inspection object 202 to be inspected to the photographing view field of the imaging apparatus 203. After a comparison image is obtained by photographing the inspection object 202, the imaging apparatus 203 sends the comparison image to the calculation apparatus 204. This comparison image is taken by broad view field photographing having the same view field as that for template photographing, and often contains in the photographing view field a partial image same as the image of the previously selected template area. The comparison image does not exist in the view field in a rare case. It is desired in the following processes that whether the comparison image exists in the view field can be judged without erroneous recognition (Step 1306).

(7) The modified template matching processing module 217 of the calculation apparatus 204 performs template matching between the modified template formed in the process at Step 1303 and the comparison image photographed in the process at Step 1306 to detect the highest correlation value. If the detected highest correlation value exceeds the threshold value set in the process at Step 1305, it is judged that the same image as the template is contained in the view field of the comparison image, and the position providing the highest correlation value is used as a matching position. After the matching position is obtained, the flow advances to the next Step 1308. If the detected highest correlation value is lower than the threshold value set in the process at Step 1305, it is judged that the same image as the template is not contained in the view field of the comparison image, and the calculation apparatus 204 displays on the display apparatus 205 to the effect that it is judged as "not contained in the view field", and urges an operator to enter the inspection object 202 in the photographing view field of the imaging apparatus to thereafter return to the process at Step 1306 and continue the following Steps (Step 1307).

(8) The calculation apparatus 204 calculates photographing parameters by using as an origin the matching position determined by template matching at Step 1307 in such a manner that the imaging apparatus 203 can photograph the area at a desired position in the photographed image, and transmits the photographing parameters to the imaging apparatus 203 to control it. In accordance with the received photographing parameters, the inspection object 202 is photographed at a high precision, and the photographed image is transmitted to the calculation apparatus 204 (Step 1308).

(9) In accordance with the image photographed at a high precision, the calculation apparatus 204 performs a desired inspection process and displays the inspection result on the display apparatus 205. If a next inspection object 202 is to be inspected, the flow returns to the process at Step 1306 to continue the following Steps (Step 1309).

Figure 14:
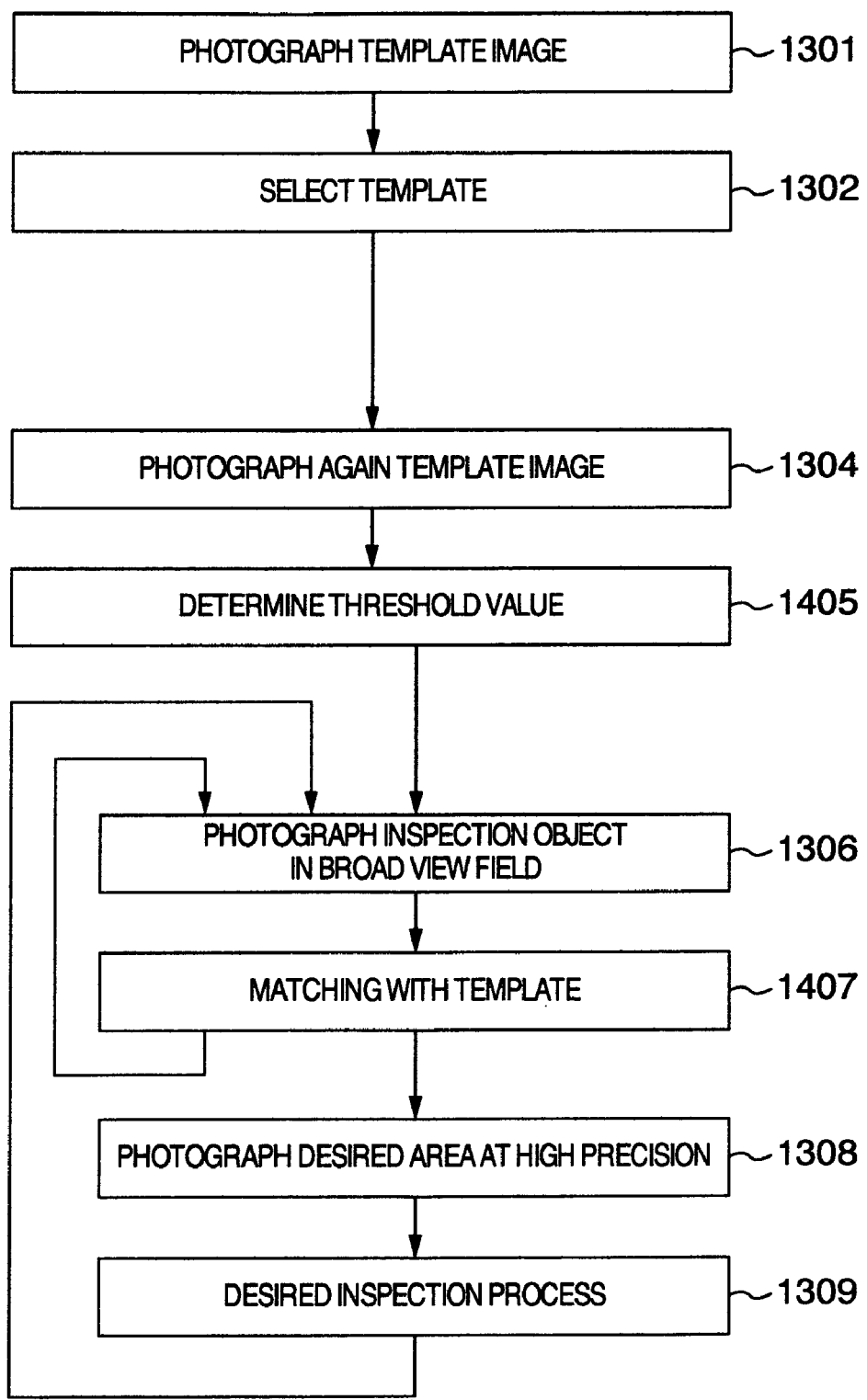
FIG. 14 is a flow chart illustrating the whole operation of a template matching apparatus according to prior art.

FIG. 14 is a flow chart illustrating the whole operation of a template matching apparatus according to prior art. The operation of the conventional template matching apparatus will be described comparing with the operation of the template matching apparatus of the fourth embodiment described with reference to FIG. 13.

As compared to the operation of the fourth embodiment shown in FIG. 13, the operation of the conventional template matching apparatus shown in FIG. 14 is different in that Step 1303 of forming a modified template is omitted. Namely, the present invention is characterized in providing the process at Step 1303 of forming a modified template. Therefore, although matching with the template original image is performed conventionally, matching with the modified template is performed in the present invention. Correspondingly, in the present invention, a conventional Step 1405 of determining a threshold value is replaced with Step 1305 of determining the threshold value of the embodiment, and a conventional Step 1407 of matching with the template is replaced with Step 1307 of matching with the modified template. Other processes at other Steps are the same for both the present invention and prior art.

As described earlier, the feature of the present invention resides in providing Step 1303 of forming a modified template.

Template matching techniques are techniques well known conventionally, and are described in "Basics and Applications of Digital Image Processing by Visual C#.NET & Visual Basic.NET—From Fundamental Concept to Portrait Image Recognition", by Kouichi SAKAI, CQ Publication Co. Ltd, First Edition, Sep. 1, 2003. Template matching techniques are the technique of calculating the template and the partial image in each area of an input image (in this case, a photographed image) and evaluating the similarity degree of each area. As an evaluation formula for evaluating a similarity degree, correlation is used being described in "Basics and Applications of Digital Image Processing by Visual C#.NET & Visual Basic.NET—From Fundamental Concept to Portrait Image Recognition", by Kouichi SAKAI, CQ Publication Co. Ltd, First Edition, Sep. 1, 2003.

A template matching calculation formula for an evaluation formula using correlation is given in the following formula (9).

$$Val(x0, y0) = (\Sigma(T(i,j) - ht)^*(G(x0+i, y0+j) - hg))/(|T-hg| \cdot |G-hg|) \quad (9)$$

wherein:

Val(x0, y0) represents an evaluation value at an evaluation point, i.e., a similarity degree;

T(i, j) represents a luminance value of a pixel at i-th row and j-th column of a template original image for prior art, or of a modified template for the fourth embodiment of the present invention;

G(x0+i, y0+j) represents a luminance value of a pixel at i-th row and j-th column of a partial image having the same size as that of the template and cut from the input image (photographed image) by using as an origin a point (x0, y0);

ht represents an average luminance value of the template, i.e., ht=ΣT(i, j)/(Nx·Ny);

hg represents an average luminance value of the target partial image, i.e., hg=ΣG(i, j)/(Nx·Ny);

Nx represents a row size of the template, and Ny is a column size of the template;

|T−hg| represents a magnitude of a difference from the average luminance of the whole template, i.e., |T−hg|=sqrt(Σ (T(i, j)−ht)*(T(i, j)−ht);

|G−hg| represents a magnitude of a difference from the average luminance of the whole partial image, i.e., |G−hg|=sqrt(Σ(G(x0+i, y0+j)−hg)*(G(x0+i, y0+j)−hg));

sqrt represents square root; and

Σ represents a total sum of all combinations of i-th row and j-th column.

By changing x0 and y0 in the formula (9), a similarity degree at each point is calculated so that a similarity map can be formed.

There are a variety of evaluation formulas for evaluating a similarity degree in addition to the evaluation formula (9) using correlation. An evaluation formula can be selected in accordance with the type of an image. Next, evaluation formulas are shown using sum of products, sum of squares of difference, and sum of squares of difference from average.

$$Val(x0, y0) = \Sigma(T(i,j)^*G(x0+i, y0+j)) \quad (10)$$

The formula (10) is an evaluation formula using sum of products, and uses "distance" in "Basics and Applications of Digital Image Processing by Visual C#.NET & Visual Basic.NET—From Fundamental Concept to Portrait Image Recognition", by Kouichi SAKAI, CQ Publication Co. Ltd, First Edition, Sep. 1, 2003. The meaning of each term of the formula (10) is the same as that of the formula (9).

$$Val(x0, y0) = \Sigma(T(i,j) - G(x0+i, y0+j))^*(T(i,j) - G(x0+i, y0+j)) \quad (11)$$

The formula (11) is an evaluation formula using sum of squares of difference. The meaning of each term of the formula (11) is the same as that of the formula (9).

$$Val(x0, y0) = \Sigma(T(i,j) - ht - G(x0+i, y0+j) + gt)^*(T(i, j) - ht - G(x0+i, y0+j) + gt) \quad (12)$$

The formula (12) is an evaluation formula using sum of squares of difference from average. The meaning of each term of the formula (10) is the same as that of the formula (9).

When a similarity degree is evaluated by "correlation" or "sum of products", the larger the similarity degree value is, it means the image is more similar to the template, whereas when a similarity degree is evaluated by "sum of squares of difference" or "sum of squares of difference from average", the smaller the similarity degree value is, it means the image is more similar to the template.

Figure 15:
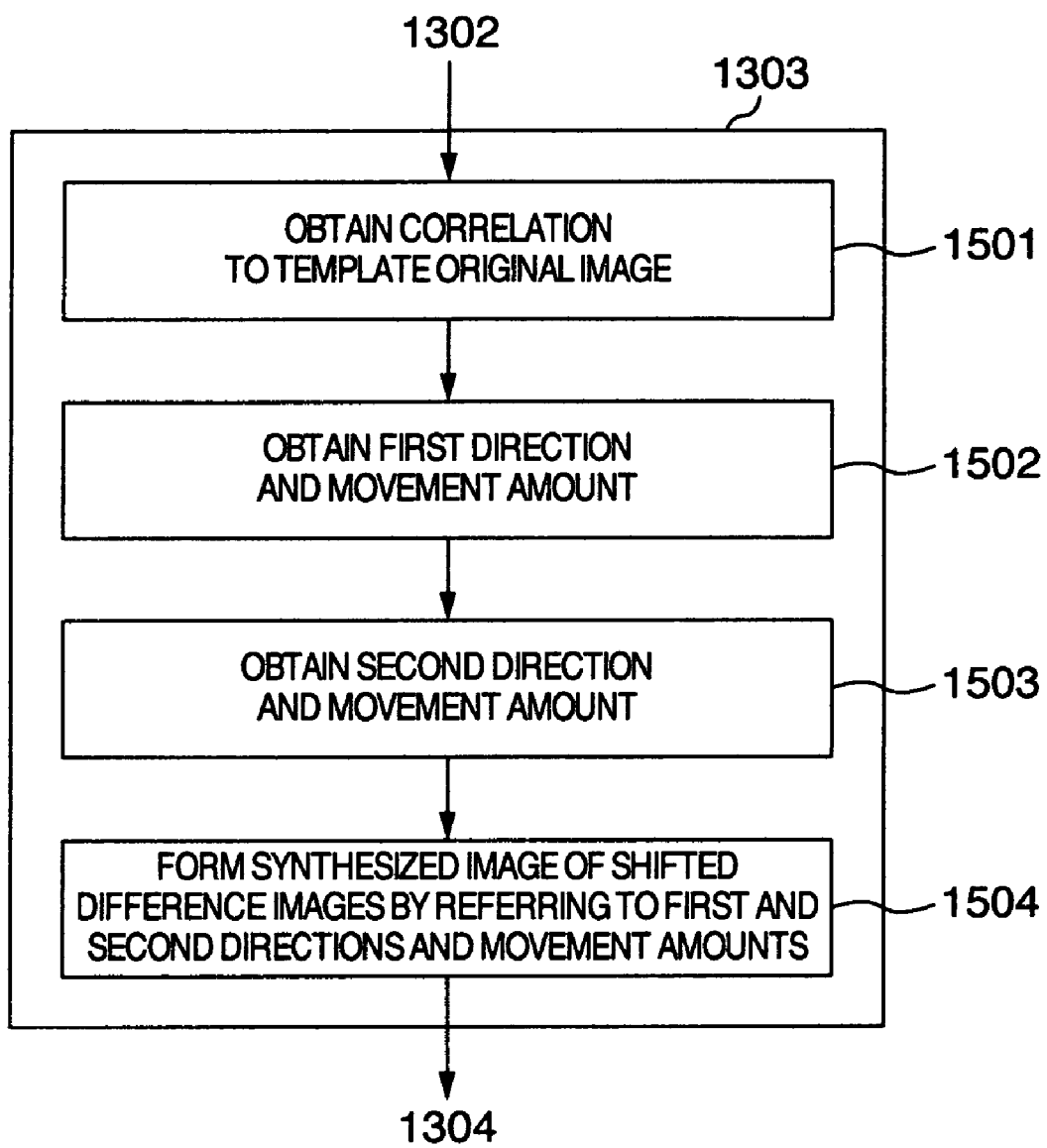
FIG. 15 is a flow chart illustrating the details of the process of forming a modified template at Step 1303 in the flow chart shown in FIG. 13.
Figure 16:
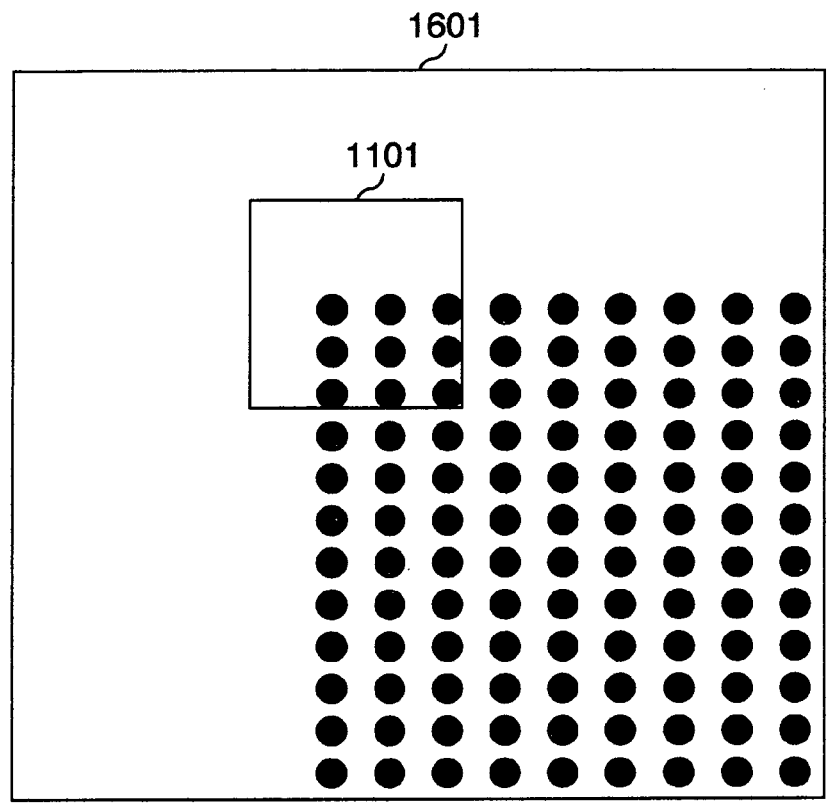
FIG. 16 is a diagram showing an example of an image photographed for a template in the process at Step 1301.
Figure 17:
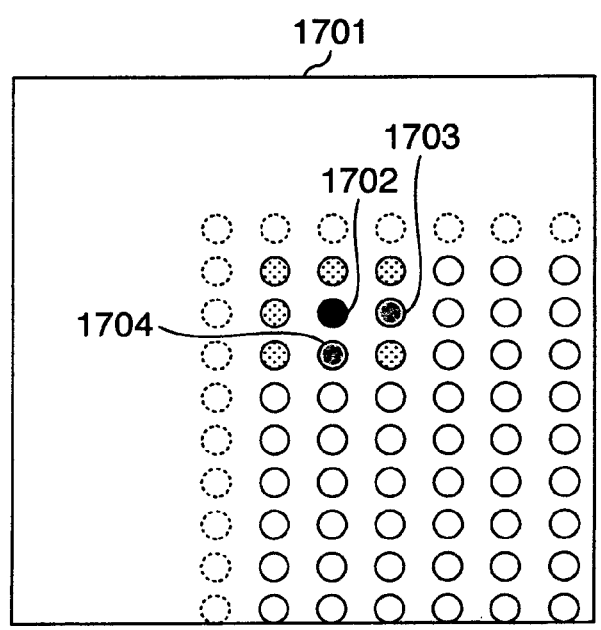
FIG. 17 is a diagram showing an example of a similarity degree map formed in the process at Step 1303 shown in FIG. 13.

FIG. 15 is a flow chart illustrating the details of the process of forming a modified template at Step 1303 in the flow chart shown in FIG. 13, FIG. 16 shows an example of an image photographed for a template in the process at Step 1301, and FIG. 17 is a diagram showing an example of the similarity map formed in the process at Step 1303. With reference to FIGS. 16 and 17, description will be made on the details of the process of forming a modified template.

It is assumed now that FIG. 15 shows a positional relation between an image 1601 photographed for a template in the process at Step 1301 and a template original image 1101 selected as a template in the process at Step 1302. In the example shown in FIG. 16, an upper left corner area of the image 1601 having a number of images (each being represented by a black circle) having almost the same shape and disposed periodically is selected as the template original image 1101.

(1) As the process starts, template matching is performed between the template original image 1101 as a template and the image 1601 photographed for a template as an input image. This template matching process is local autocorrelation because the template is part of the input image, and correlation is performed between all pixels of the template original image 1101 and all pixels of the image 1601 by changing the relative position between the template original image 1101 and image 1601. A similarity degree map 1701 is therefore obtained as shown in FIG. 17. The similarity degree map 1701 is analogous to the image 1601 and shows a magnitude of a similarity degree at each position. The position 1702 having the highest similarity degree indicates the position of the template original image (Step 1501).

(2) Thereafter, the position 1702 having the highest similarity degree is detected from the similarity degree map 1701 shown in FIG. 17, and the position coordinates (p0, q0) of this position are obtained. A position 1703 having the next highest similarity degree is detected in a predetermined area having as its center the coordinates (p0, q0) in the similarity degree map 1701, and the position coordinates (p1, q1) of this position are obtained. First direction and movement amount are obtained from the two sets of coordinates. The first direction and movement amount are represented by (p1−p0, q1−q0) in vector notation. The predetermined area having as its center the coordinates (p0, q0) can be determined depending upon the period at which a similar morphology of the inspection object appears, and the like. For example, a default area may be an area of ±32 upper, lower, right and left pixels excluding an area near ±4 pixels. This default area may be changed by checking later the results (Step 1502).

(3) Next, a direction and a movement amount at which the next similar morphology appears are obtained by weighing a direction perpendicular to the first direction obtained in the process at Step 1502. These direction and movement amount are second direction and movement amount. A weight of a position (p, q) uses a square of an outer product of (p−p0, q−q0) and (p1−p0, q1−q0) divided by squares of each length. This result in a square of sine of angle between two vectors. More specifically, the following formulas (11) to (14) are used (step 1503).

A weight w(p, q) is given by the following formula (13).

$$w(p, q) = S*S/(r1*r2) \quad (13)$$

An outer product is given by the following formula (14).

$$S=(p-p0)*(q1-q0)-(q-q0)*(p1-p0) \quad (14)$$

A square of a length is given by the following formula (15).

$$r1=(p-p0)*(p-p0)+(q-q0)*(q-q0) \quad (15)$$

A square of a length of the first direction vector is given by the following formula (16).

$$r2=(p1-p0)*(p1-p0)+(q1-q0)*(q1-q0) \quad (16)$$

The weight w(p, q) calculated from the formulas (11) to (14) is multiplied by the similarity degree value (correlation value) at a corresponding position in the similarity degree map. The position 1702 having the largest value among the calculated values is obtained in the same predetermined area as that used by the process at Step 1502, and the coordinate values (p2, q2) of this position are obtained. A vector of the second direction and movement amount is represented by (p2−p0, q2−q0).

(4) Next, by referring to the first direction and movement amount and the second direction and movement amount, a difference image is formed between an image moved from the image 1601 photographed for a template and the template original image 1101. A plurality of difference images are formed by changing the reference method to the direction and movement amount, and the synthesized image of these difference images is used as the modified template (Step 1504).

Figure 11:
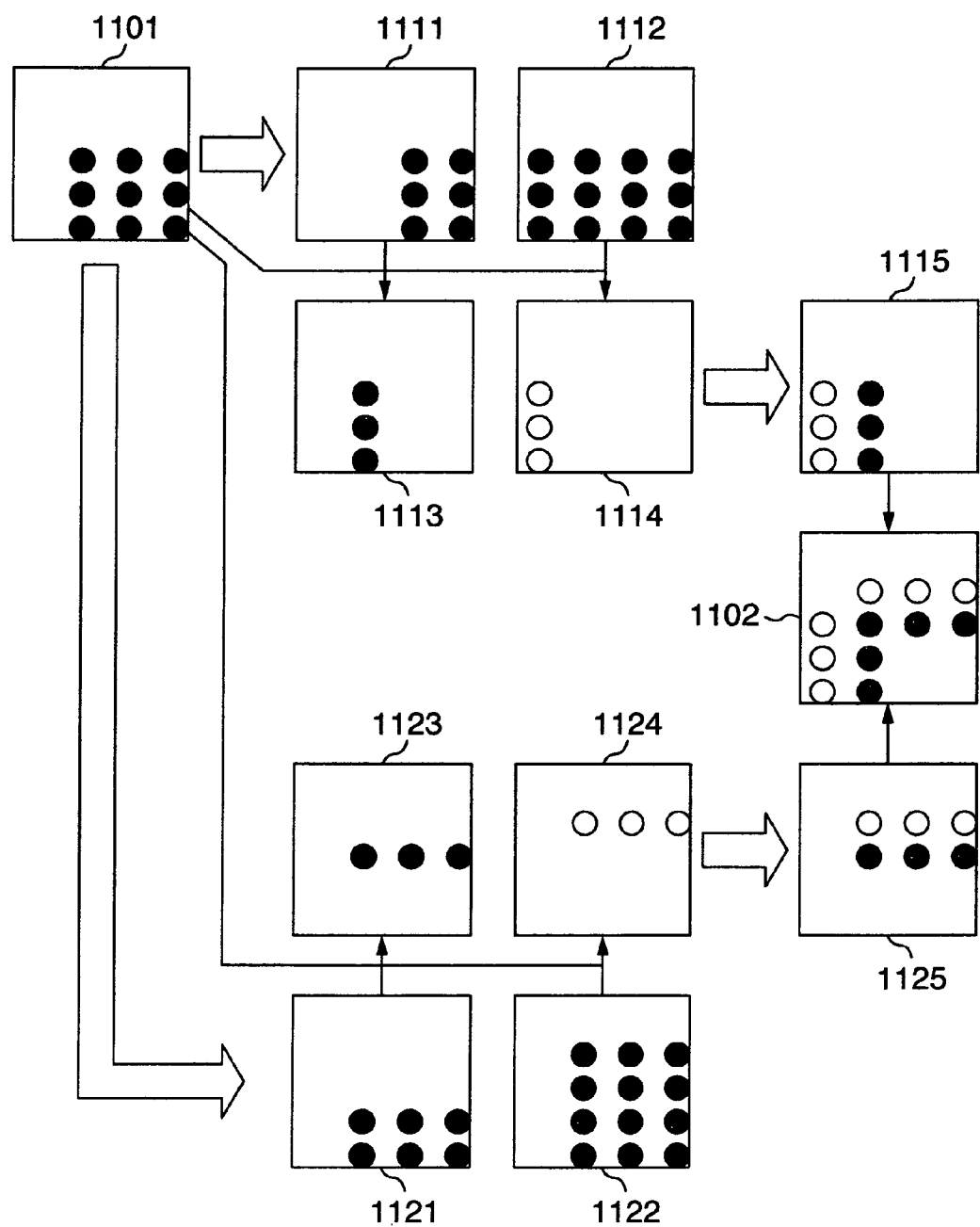
FIG. 11 is a diagram illustrating how a synthesized image is formed in the process at Step 1504 shown in FIG. 15.

FIG. 11 is a diagram illustrating how a synthesized image is formed in the process at Step 1504. This operation will now be described.

In the example shown in FIG. 11, difference images 1113 and 1114 are formed between the template original images 1101 and images 1111 and 1112 photographed for a template and moved along the first direction, and difference images 1123 and 1124 are formed between the template original image 1101 and images 1121 and 1122 photographed for a template and moved along the second direction. The difference images 1113 and 1114 are synthesized to form a synthesized difference image 1115, and the difference images 1123 and 1124 are synthesized to form a synthesized difference image 1125. The synthesized difference images 1115 and 1125 are synthesized to form a modified template 1102.

In the example shown in FIG. 11, a black circle indicates a pattern existing only in the template original image 1101, and a white circle indicates a pattern as a phantom image existing only in the image 1601 photographed for a template.

With reference to FIG. 11, more specific description will be made. The difference image 1113 is a difference image between the template original image 1101 and the image 1111 at the template position of the image 1601 photographed for a template and moved by (p1−p0, q1−q0). The formulas for forming each difference image including this difference image 1113 will be described in the following.

The difference image 1113 (Sa113(i, j)) is given by the following formula (17).

$$Sa113(i, j) = T0(i, j) - G0(xt+i-(p1-p0), yt+j-(q1-q0)) \quad (17)$$

where T0(i, j) represents a luminance value of a pixel at i-th row and j-th column of the template original image 1101, G0(xt+i−(p1−p0), yt+j−(q1−q0)) represents a luminance value of a pixel at a position (xt+i−(p1−p0), yt+j−(q1−q0)) of the image 1601 photographed for a template, and the position (xt, yt) in the image 1601 photographed for a template corresponds to an origin of the template and is (G0(xt+i, yt+j)=T0 (i, j).

Description will be made similarly on the formulas for giving the difference images 1114, 1123 and 1124 between the template original image 1101 and the images 1112, 1121 and 1122 moved to the template position.

The difference image 1114 (Sa114(i, j)) is given by the following formula (18).

$$Sa114(i, j) = T0(i, j) - G0(xt+i+(p1-p0), yt+j+(q1-q0)) \quad (18)$$

The difference image 1123 (Sa123(i, j)) is given by the following formula (19).

$$Sa123(i, j) = T0(i, j) - G0(xt+i-(p2-p0), yt+j-(q2-q0)) \quad (19)$$

The difference image 1124 (Sa124(i, j)) is given by the following formula (20).

$$Sa124(i, j) = T0(i, j) - G0(xt+i+(p2-p0), yt+j+(q2-q0)) \quad (20)$$

Next, description will be made on the formulas for forming the synthesized difference images 1115 and 1125 and modified template image 1102.

The synthesized image 1115 (SS115(i, j)) is given by the following formula (21).

$$SS115(i, j) = (Sa113(i, j) + Sa114(i, j))/2 \quad (21)$$

The synthesized image 1125 (SS125(i, j)) is given by the following formula (22).

$$SS125(i, j) = (Sa123(i, j) + Sa124(i, j))/2 \quad (22)$$

The modified template 1102 (SS102(i, j)) is given by the following formula (23).

$$SS102(i,j) = (Sa115(i,j) + Sa125(i,j))/2 \quad (23)$$

The modified template 1102 can be formed by image synthesizing described above.

Figure 18:
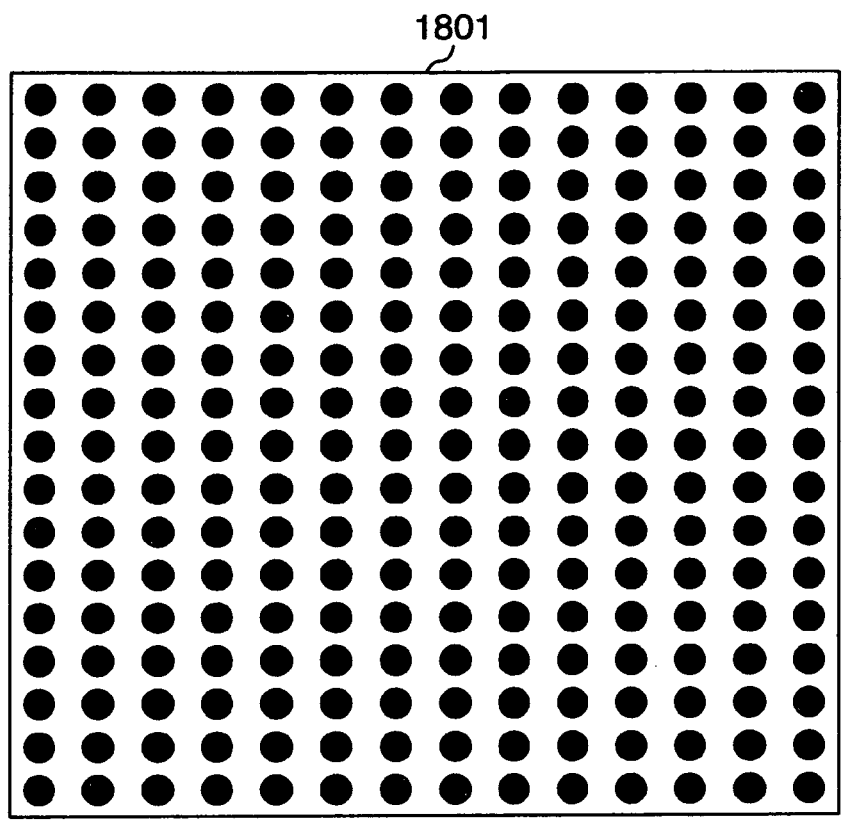
FIG. 18 is a diagram showing an example of a comparison image when the same area as the template original image is not contained in the comparison image obtained by photographing an inspection object in the process at Step 1306 shown in FIG. 13.
Figure 19:
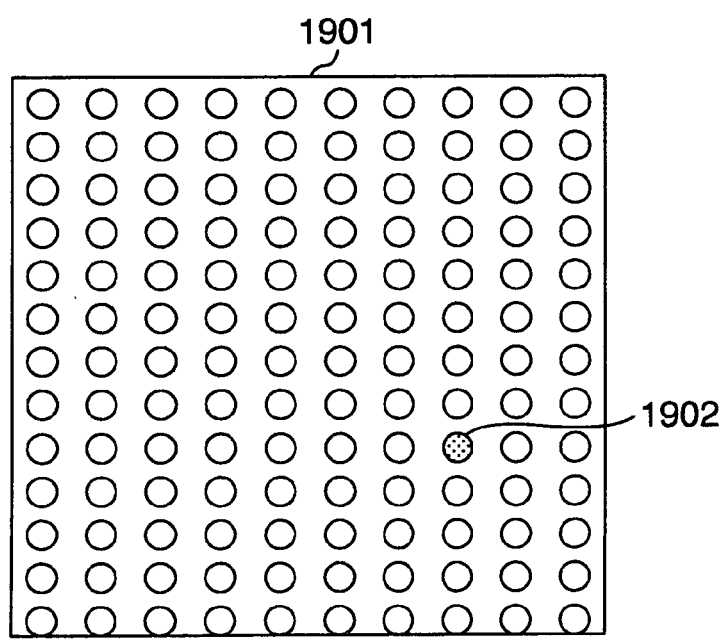
FIG. 19 is a diagram showing an example of a similarity degree map obtained through template matching between the comparison image shown in FIG. 18 and the template original image according to prior art.

FIG. 18 is a diagram showing an example of a comparison object image obtained by photographing an inspection object in the process at Step 1306 shown in FIG. 13. In this example, the comparison object image has no area same as the template original image. FIG. 19 is a diagram showing an example of a similarity degree map obtained by conventional template matching between the comparison object image shown in FIG. 18 and the template original image.

In the example shown in FIG. 18, a number of images having the same shape spread in the whole view field in the periodical shape. According to prior art, template matching is performed between the template original image 1101 and the image 1801 of the inspection object having a periodical shape spread in the whole view field. The resultant similarity degree map is like that shown in FIG. 19. The similarity degree map 1901 has periodical points having a high similarity degree. Among them, the point 1902 having the highest similarity degree is a point accidently having the highest similarity degree because noises and errors caused by morphology change operate accidentally to raise the similarity degree. Although this point is highly similar to the template, it has a morphology different from that of the template. According to prior art, because of considerable influence of noises and morphology change, there is a high erroneous recognition probability that the point having the same morphology as that of the template exists although it does not exist in the view field of the image of the inspection object.

In the present invention, since template matching described above is performed with the modified template 1102, as different from prior art shown in FIG. 19, the resultant similarly degree map has no conspicuous period having as a whole a high similarity degree, and it is possible to lower an erroneous recognition probability that the point having the same morphology as that of the template exists although it does not exist in the view field of the image of the inspection object. Namely, the present invention provides the advantage that errors of template matching recognition can be reduced.

Next, description will be made on raising a matching precision by pre-processing a photographed image. In order to raise a matching precision of a template matching process, there is a method of pre-processing a photographed image. In this case, in the process at Step 1303 in the flow chart shown in FIG. 13, when a difference image is formed after the direction and movement amount of an area near a predetermined area where a similar morphology appears are detected, an image photographed for a template is pre-processed, a difference image is formed between the moved image and the pre-processed template area by referring to the direction and movement amount of an area where the pre-processed template image is detected, and similar to the manner described with reference to FIG. 13, a plurality of difference images are formed by changing the reference method to the direction and movement amount and synthesized to form a pre-processed modified template. In the process at Step 1305, template matching is performed by using an image obtained by pre-processing a threshold value detection image as an input image and the pre-processed modified template as a template. Thereafter, in the manner similar to that described with reference to FIG. 13, a threshold value is determined. Further, in the process at Step 1307, template matching is performed between the pre-processed modified template and the image obtained by pre-processing the comparison object image, and thereafter a process similar to that described with reference to FIG. 13 is executed.

The pre-processing may be a process such as filtering for blurring an image by using an average of an area of 3×3 pixels or the like. By introducing the pre-processing, it is advantageous in that erroneous recognition in a template matching process can be reduced further.

Next, description will be made on raising further the matching precision by forming a difference image between photographed images. If inspection objects have almost reliably a regular, correct and similar background, photographed images are subjected to a process similar to the process of forming the difference images and synthesized image for the template described with reference to FIG. 11, in accordance with the direction and movement amount detected in the process at Step 1303 of forming the modified template. Template matching is performed by using the modified template and as an input image a synthesized image of difference images of photographed images processed in a manner similar to that for the template. The influence by the regular, correct and similar background is suppressed so that a precision of template matching can be improved further.

In obtaining the direction and movement amount in the process at Step 1303 described with reference to FIG. 13, the direction and movement amount may be obtained at a subpixel level by using an interpolation method such as cubic interpolation. In forming a difference image, the difference image may be obtained by interpolation of movement at a subpixel level. In this manner, the advantage can be obtained that erroneous recognition of template matching can be reduced more than movement at a pixel level.

Next, description will be made on a template matching apparatus according to the fifth embodiment of the present invention. The whole system configuration and the structure of a calculation apparatus of the fifth embodiment are the same as those of the fourth embodiment shown in FIGS. 2A and 12. Although not shown, the different points from the fourth embodiment reside in that the main memory 213 of the calculation apparatus stores a module for forming two modified template candidates in place of the modified template forming module 215 and a modified template determining and threshold value determining module in place of the threshold value determining module 216.

Figure 20:
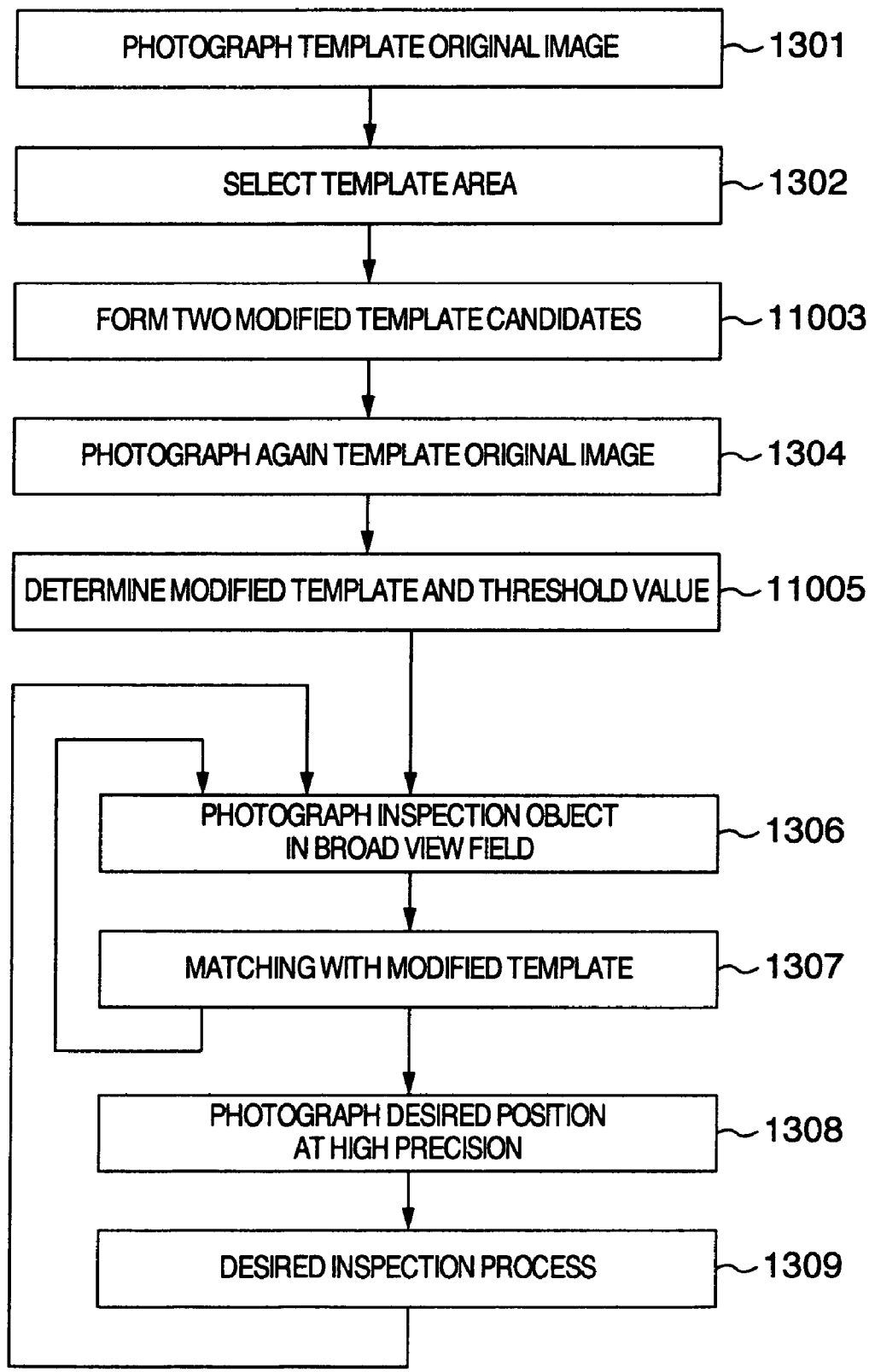
FIG. 20 is a flow chart illustrating the whole operation of a template matching apparatus according to a fifth embodiment of the present invention.

FIG. 20 is a flow chart illustrating the whole operation of the template matching apparatus according to the fifth embodiment of the present invention. The operation will now be described. In the following description, the present invention is applied to an inspection object of a circuit board or the like with a number of similar circuit patterns disposed periodically.

The flow chart of the fifth embodiment shown in FIG. 20 is compared with the flow chart of the fourth embodiment shown in FIG. 13. In the fifth embodiment, the modified template forming Step 1303 in FIG. 13 is replaced with Step 11003 of forming two modified template candidates, and the threshold value determining Step 1305 in FIG. 13 is replaced with Step 11005 of determining a modified template candidate from two modified template candidates and determining a threshold value. Other points are the same as those of the fourth embodiment.

With reference to FIG. 20, only different points of the fifth embodiment from the fourth embodiment will be described.

In the process at Step 11003, two modified template candidates are formed. The template candidate forming method is the same as the method of forming a template of the fourth embodiment, and an intermediate product in the fourth embodiment is used as one candidate. A specific example of forming a modified template will be described with reference to FIG. 11.

One of two modified template candidates of the fifth embodiment is the modified template 1102 of the fourth embodiment shown in FIG. 11. The other is the synthesized image 1115 formed along the first direction. These two templates are used as the modified template candidates.

In the process at Step 11005, template matching is performed between the image obtained by photographing an inspection object and the two modified template candidates formed at Step 11003. Two similarity degree maps are therefore obtained. The highest similarity degree value and second highest similarity degree value are obtained from each of the similarity degree maps. A ratio of (second highest similarity degree/highest similarity degree) is calculated for each of the similarity degree maps, and the modified template candidate having a higher ratio is determined as the modified template. A threshold value is determined from the highest similarity degree value and second highest similarity degree value of the determined modified template, in a manner similar to that at Step 1305 of the fourth embodiment. Other points are quite the same as those of the fourth embodiment.

In summary, in the process at Step 11003 of the fifth embodiment, the direction and movement amount of an area near a predetermined area of the template original image 1101 where a similar morphology appears are detected for each of the first and second directions. A difference image is formed between the template original image 1101 and an image obtained by moving the image for the template, by referring to the direction and movement amount. A plurality of difference images are formed by changing the reference method to the movement amount in the first direction, and synthesized to form the synthesized image 1115 which is used as a first tentative template. A plurality of difference images are formed by changing the reference method to the movement amount in the second direction, and synthesized to form the synthesized image 1125. The synthesized image 1125 and the synthesized image 1115 of the first tentative image are synthesized to form an image (first modified template 1102) which is used as a second tentative image.

In the process at Step 11005, template matching is performed by using as an input image a threshold value detection image obtained by photographing the same area of the same inspection object photographed for a template at Step 1304, and as the template the first tentative template, to thereby perform first similarity degree evaluation of each area. Template matching is also performed by using as the template the second tentative template, to thereby perform second similarity degree evaluation of each area.

A first ratio is calculated by using as a denominator the highest similarity degree value among similarity degrees obtained by the first similarity degree evaluation, and as a numerator the second highest similarity degree value. A second ratio is calculated by using as a denominator the highest similarity degree value among similarity degrees obtained by the second similarity degree evaluation, and as a numerator the second highest similarity degree value. The first ratio is compared with the second ratio, and the tentative template having a lower ratio is used as the modified template.

In the fifth embodiment, if the synthesized image 1115 formed in the first direction is suitable for the template, this synthesized image is used as the modified template. The advantage that a possibility of reducing erroneous recognition of template matching can be increased more than the fourth embodiment.

Next, description will be made on a template matching apparatus according to the sixth embodiment of the present invention. The whole system configuration and the structure of a calculation apparatus of the fifth embodiment are the same as those of the second embodiment shown in FIGS. 2A and 12. Although not shown, the different points from the fourth embodiment reside in that the main memory 213 of the calculation apparatus stores a module for forming two types of modified templates in place of the modified template forming module 215, a weight and threshold value determining module in place of the threshold value determining module 216, and a matching processing module for matching with two types of modified templates in place of the modified template matching module 217.

Figure 21:
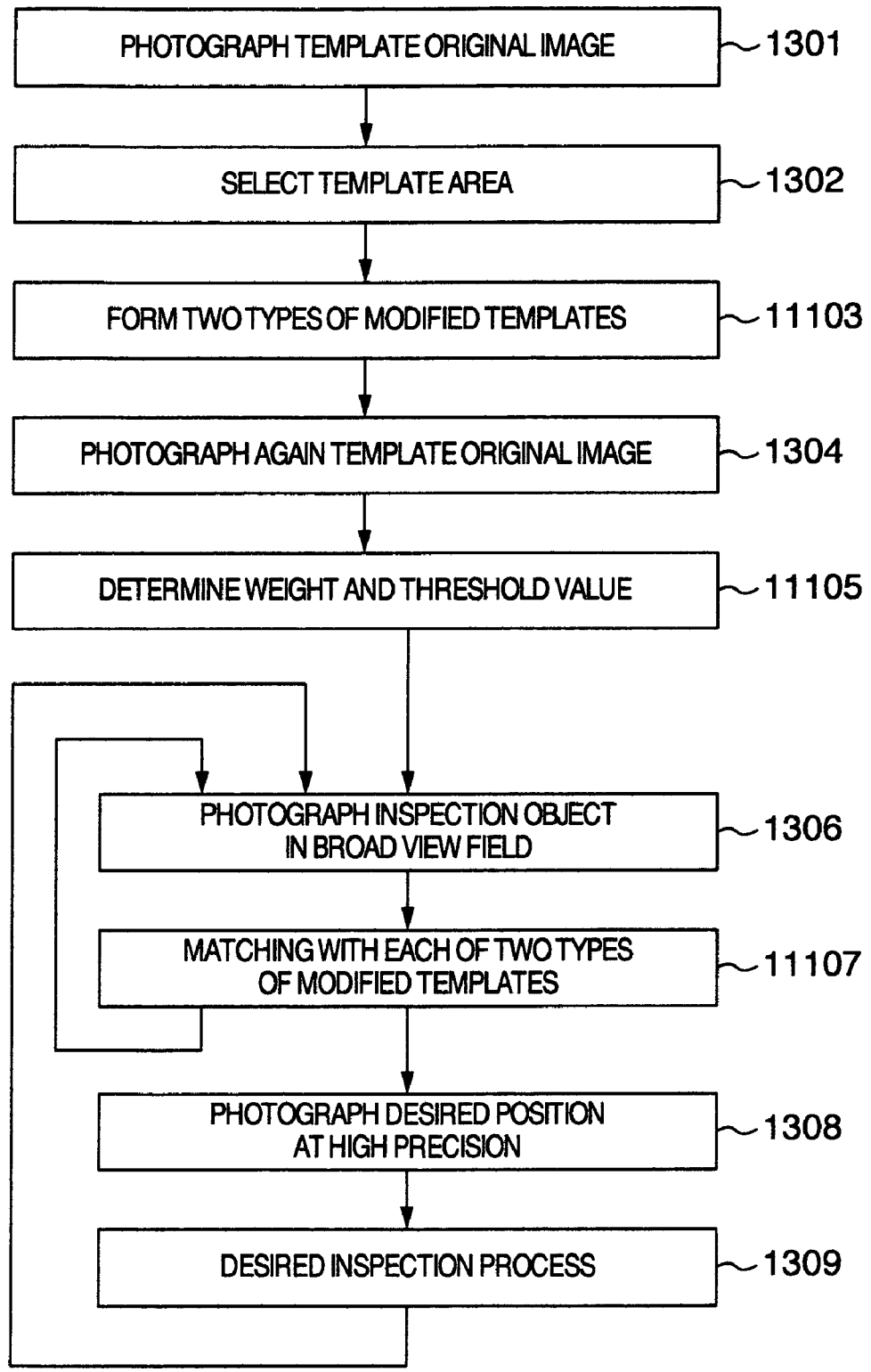
FIG. 21 is a flow chart illustrating the whole operation of a template matching apparatus according to a sixth embodiment of the present invention.
Figure 22:
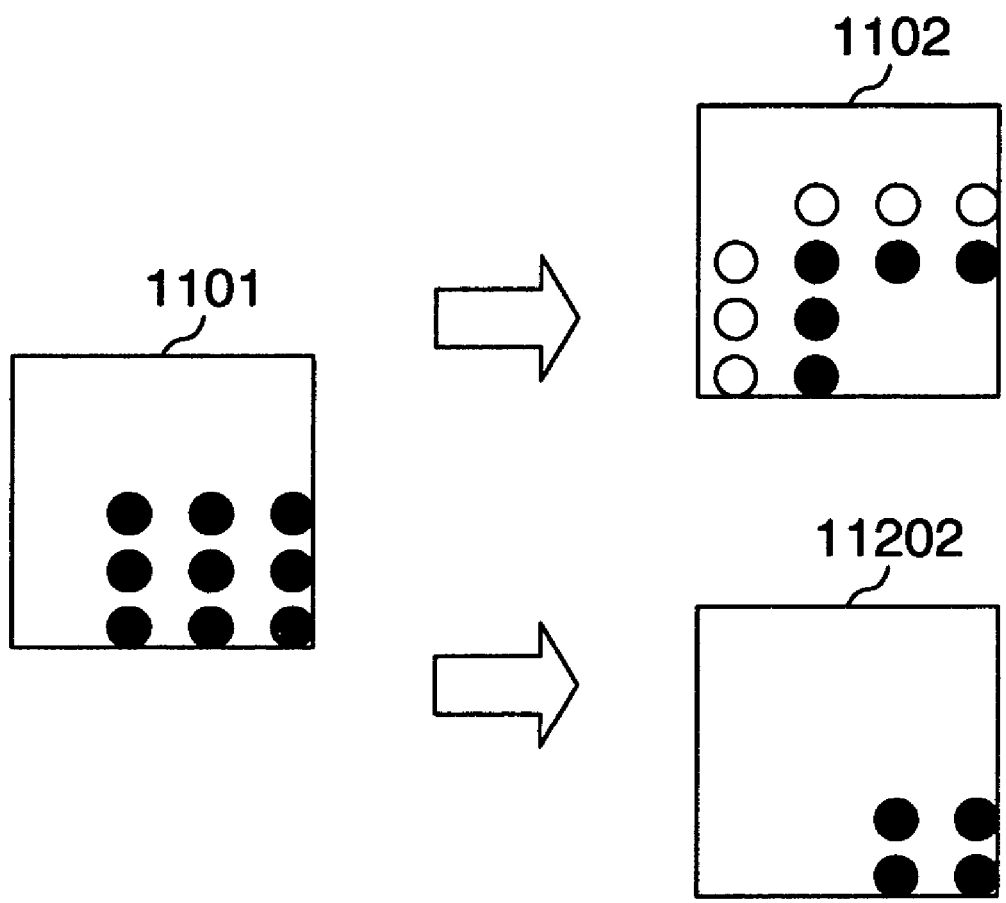
FIG. 22 is a diagram showing an example of a template formed in the process at Step 11103 in the flow chart of FIG. 21.

FIG. 21 is a flow chart illustrating the whole operation of the template matching apparatus according to the sixth embodiment of the present invention, and FIG. 22 is a diagram showing an example of two types of modified templates formed in the process at Step 11103 in the flow chart of FIG. 21. The operation will now be described. In the following description, similar to the fourth embodiment, the present invention is applied to an inspection object of a circuit board or the like with a number of similar circuit patterns disposed periodically.

The flow chart of the fifth embodiment shown in FIG. 21 is compared with the flow chart of the fourth embodiment shown in FIG. 13. In the sixth embodiment, the modified template forming Step 1303 in FIG. 13 is replaced with Step 11103 of forming two types of modified templates, the threshold value determining Step 1305 in FIG. 13 is replaced with Step 11105 of determining a threshold value, and the modified template matching Step 1307 is replaced with Step 11107 of matching with two types of modified templates. Other points are the same as those of the fourth embodiment.

With reference to FIG. 21, only different points of the sixth embodiment from the fourth embodiment will be described.

In the process at Step 11103, the modified template 1102 of the fourth embodiment is used as a first modified template of the sixth embodiment, the template original image 1101 is compared with the first modified template 1102 to extract an area photographed in the template original image 1101 and not photographed in the first modified template 1102. The image of this area is used as a second modified template 11202. Two types of modified templates 1102 and 1202 are therefore obtained as shown in FIG. 22.

Specific description will be made. A luminance value of a pixel at i-th row and j-th column of the template original image 1101 is represented by T0(i, j), and a luminance value of a pixel at i-the row and j-th column of the first modified template 1102 is represented by SS102(i, j). A luminance value SS1202(i,j) of a pixel at i-the row and j-th column of the second modified template 1202 is given by the following formula (24) so that the second modified template 11202 can be formed.

$$SS1202(i, j) = \max(fabs(T0(i, j)) - fabs(SS102(i, j)), 0) \quad (24)$$

where max (a, b) represents a function of selecting a larger one of a and b. In this case, if the left value is larger than 0, the left value is selected, whereas if the left value is smaller than 0, a value of 0 is selected.

In the process at Step 11105, template matching is performed between the image obtained by photographing the inspection object and each of two modified templates formed in the process at Step 11103. Two similarity degree maps are therefore obtained. A synthesized similarity degree map is formed from two similarity degree maps by using a predetermined weight as in the following formula (25).

$$val3(i,j)=\mathrm{sqrt}((1-k)*val1(i,j)*val1(i,j)+k*val2(i,j)*val2(i,j)) \quad (25)$$

where val1(i, j) represents a value at i-th row and j-th column of the first similarity degree map, val2(i, j) represents a value at i-th row and j-th column of the second similarity degree map, val3(i, j) represents a value at i-th row and j-th column of the synthesized similarity degree map, k represents a weight, and sqrt( ) represents a root function.

The weight may be a predetermined value, e.g., 0.5 or may be adjusted from the result to reduce erroneous recognition. The upper limit value may be set to val1(i, j) and val2(i, j) to cut too large a value and lower to the upper limit value. In this case, since abnormal values exceeding the upper limit value can be removed, it is possible to have the advantage that the val1(i, j) and val2(i, j) can be evaluated with proper balance therebetween. Next, in the process at Step 11105, a predetermined intermediate value is used as the threshold value by referring to the largest value and second largest value of the synthesized similarity degree map, in the manner similar to that of the fourth embodiment.

In the process at Step 11107, template matching is performed between each of two types of modified templates formed in the process at Step 11103 and the comparison image photographed in the process at Step 1306. Two similarity degree maps are therefore formed in correspondence with two types of modified templates. A synthesized similarity map is formed by using the formula (22) similar to the process at Step 11105. If the highest similarity degree in the synthesized similarity degree map exceeds the threshold value set in the process at Step 11105, it is judged that the view field of the comparison image contains the same area as the template, and the position at the highest synthesized similarity degree is used as the matching position to thereafter advance to the next Step 1308. If the highest similarity degree of the synthesized similarity map is lower than the threshold value set at Step 11105, it is judged that the view field of the comparison image does not contain the same area as the template, and the calculation apparatus 204 displays on the display apparatus 205 to the effect that it is judged as "not contained in the view field" to thereafter return to Step 1306. Other points are quite the same as those of the fourth embodiment.

In summary of the foregoing description, in the sixth embodiment of the present invention, the direction and movement amount of an area near a predetermined area of the template original image where a similar morphology appears are detected in the process at Step 11103. A difference image is formed between the template original image 1101 and an image obtained by moving the image for a template, by referring to the direction and movement amount. A plurality of difference images 1113, 1114, 1123 and 1124 are formed by changing the reference method to the direction and movement amount. A synthesized image, i.e., the modified template 1102 of the fourth embodiment, is used as the first modified template. The second modified template 11202 is formed by referring to the template original image and first modified template.

In the process at Step 11105, template matching is performed using a predetermined evaluation formula, by using as an input image the threshold value detection image obtained by photographing the same area of the same object as that of the template image, and as a template the first modified template 1102, to thereby perform the first threshold value similarity degree evaluation of each area, and further template matching is performed using a predetermined evaluation formula, by using as an input image the threshold value detection image obtained by photographing the same area of the same object as that of the template image, and as a template the second modified template 11202, to thereby perform the second threshold value similarity degree evaluation of each area. The obtained two similarity degree maps are synthesized to form a synthesized similarity degree map. A threshold value is determined by referring to the highest similarity degree and second highest similarity degree of the synthesized similarity degree map.

In the process at Step 11107, template matching is performed using a predetermined evaluation formula, by using as an input image the comparison image and as a template the first modified template 1102, to thereby perform the first comparison similarity degree evaluation of each area, and further template matching is performed using a predetermined evaluation formula, by using as an input image the comparison image and as a template the second modified template 11202, to thereby perform the second comparison similarity degree evaluation of each area. The similarity degrees of a pair of two areas are synthesized to obtain a synthesized similarity degree. It is judged from the synthesized similarity degree and threshold value whether the comparison image contains the area having the same morphology as that of the area selected by the template.

According to the sixth embodiment described above, the advantage that an erroneous recognition probability can be reduced even if there appears a morphology in the inspection object which morphology is different from the template and similar to the modified template of the fourth embodiment, i.e., the first modified template of the sixth embodiment.

Further, according to the present invention, a new modified template can be used by adding the modified template 1102 of the fourth embodiment to the template original image 1101. It is therefore possible to reduce an erroneous recognition probability even if there appears in the inspection object a morphology similar to the modified template 1102.

The present invention is applicable to all industrial fields utilizing so-called template matching. The present invention is particularly effective for a fine shape buried in a background portion and having a periodical shape and for a recognition object shape having a periodical shape. In the field of inspection apparatus, the present invention is applicable to functions such as position alignment, morphology recognition and distinguishment. For example, the present invention is applicable to circuit pattern inspection, tile missing inspection and the like. In the field of satellite image processing, the present invention is applicable to image recognition support such as position identification of regularly disposed buildings such as a housing development.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A template matching apparatus, containing at least a processor, for matching an input image obtained by photographing an inspection object with a template image, comprising:

template area selecting means for selecting a template area from an image for a template as a template original image;

similar image detecting means for detecting a similar image having a high correlation to the template original image selected by said template area selecting means, from said image for a template;

difference image forming means for forming a difference image between said template original image and said similar image;

modified template forming means for modifying said template original image so as to incur a penalty to said similar image during evaluation and forming a modified template, in accordance with said difference image; and similarity degree evaluating means for calculating said modified template and a partial image in each area of said input image and evaluating a similarity degree of each area, in accordance with a predetermined evaluation formula.

2. A template matching apparatus, containing at least a processor, for matching an input image obtained by photographing an inspection object with a template image, comprising:

area extracting means for separating and extracting a background portion and a structural portion of an image for a template, and using the background portion and structural portion as area extraction data of a template area;

template area selecting means for selecting a template area from the area extraction data of the template area extracted by said area extracting means;

similar area extraction data detecting means for detecting similar area extraction data from the image for a template, said similar area extraction data having a high correlation to said area extraction data of the template area selected by said template area selecting means;

difference area extraction data forming means for forming difference area extraction data between said area extraction data of said template area and said similar area extraction data;

modified area extraction template forming means for modifying said area extraction data of said template area so as to incur a penalty to said similar area extraction data during evaluation and forming a modified area extraction template, in accordance with said area extraction difference data; and similarity degree evaluating means for calculating said modified area extraction template and a partial image in each area of said input image and evaluating a similarity degree of each area, in accordance with a predetermined evaluation formula.

3. A template matching apparatus, containing at least a processor, for matching an input image obtained by photographing an inspection object with a template image, comprising:

area extracting means for separating and extracting a background portion and a structural portion of an image for a template, and using the background portion and structural portion as area extraction data of a template area;

template area selecting means for selecting a template area from the area extraction data of the template area extracted by said area extracting means;

similar area extraction data detecting means for detecting similar area extraction data from the image for a template, said similar area extraction data having a high correlation to said area extraction data of the template area selected by said template area selecting means;

difference area extraction data forming means for forming difference area extraction data between said area extraction data of said template area and said similar area extraction data;

border-added structure recognition data forming means for forming border-added structure recognition data having a border with a predetermined width formed between the background portion and the structural portion of said area extraction data of the template area selected by said template area selecting means;

modified structure recognition template forming means for modifying said border-added structure recognition data of said template area so as to incur a penalty to said border-added structure recognition data during evaluation and forming a modified structure recognition template, in accordance with said difference area extraction data; and similarity degree evaluating means for calculating said modified structure recognition template and a partial image in each area of said input image and evaluating a similarity degree of each area, in accordance with a predetermined evaluation formula.

4. The template matching apparatus according to claim 3, wherein values of said modified structure recognition template include a predetermined value for said structural portion, a predetermined value for said background portion having an opposite sign to said predetermined value of said structural portion, and a value of 0 for said border, and a calculation in accordance with said predetermined evaluation formula uses sum of products of the image in each area of said input image and said modified structure recognition template.

5. A template matching method for matching an input image obtained by photographing an inspection object with a template image, wherein:

there are provided template area selecting means, similar image detecting means, difference image forming means, modified template forming means and similarity degree evaluating means;

said template area selecting means selects a template area from an image for a template as a template original image;

said similar image detecting means detects a similar image having a high correlation to the template original image selected by said template area selecting means, from said image for a template;

said difference image forming means forms a difference image between said template original image and said similar image;

said modified template forming means modifies said template original image so as to incur a penalty to said similar image during evaluation and forms a modified template, in accordance with said difference image; and said similarity degree evaluating means calculates said modified template and a partial image in each area of said input image and evaluates a similarity degree of each area, in accordance with a predetermined evaluation formula.

6. A template matching method for matching an input image obtained by photographing an inspection object with a template image, wherein:

there are provided area extracting means, template area selecting means, similar area extraction data detecting means, difference area extraction data forming means, modified area extraction template forming means, and similarity degree evaluating means;

said area extracting means separates and extracts a background portion and a structural portion of an image for a template, and uses the background portion and structural portion as area extraction data of a template area;

said template area selecting means selects a template area from the area extraction data of the template area extracted by said area extracting means;

said similar area extraction data detecting means detects similar area extraction data from the image for a template, said similar area extraction data having a high correlation to said area extraction data of the template area selected by said template area selecting means;

said difference area extraction data forming means forms difference area extraction data between said area extraction data of said template area and said similar area extraction data;

said modified area extraction template forming means modifies said area extraction data of said template area so as to incur a penalty to said similar area extraction data during evaluation and forms a modified area extraction template, in accordance with said area extraction difference data; and said similarity degree evaluating means calculates said modified area extraction template and a partial image in each area of said input image and evaluating a similarity degree of each area, in accordance with a predetermined evaluation formula.

7. A template matching method for matching an input image obtained by photographing an inspection object with a template image, wherein:

there are provided area extracting means, template area selecting means, similar area extraction data detecting means, difference area extraction data forming means, border-added structure recognition data forming means, modified structure recognition template forming means and similarity degree evaluating means;

said area extracting means separates and extracts a background portion and a structural portion of an image for a template, and uses the background portion and structural portion as area extraction data of a template area;

said template area selecting means selects a template area from the area extraction data of the template area extracted by said area extracting means;

said similar area extraction data detecting means detects similar area extraction data from the image for a template, said similar area extraction data having a high correlation to said area extraction data of the template area selected by said template area selecting means;

said difference area extraction data forming means forms difference area extraction data between said area extraction data of said template area and said similar area extraction data;

said border-added structure recognition data forming means forms border-added structure recognition data having a border with a predetermined width formed between the background portion and the structural portion of said area extraction data of the template area selected by said template area selecting means;

said modified structure recognition template forming means modifies said border-added structure recognition data of said template area so as to incur a penalty to said border-added structure recognition data during evaluation and forms a modified structure recognition template, in accordance with said difference area extraction data; and said similarity degree evaluating means calculates said modified structure recognition template and a partial image in each area of said input image and evaluating a similarity degree of each area, in accordance with a predetermined evaluation formula.

8. The template matching method according to claim 7, wherein values of said modified structure recognition template include a predetermined value for said structural portion, a predetermined value for said background portion having an opposite sign to said predetermined value of said structural portion, and a value of 0 for said border, and a calculation in accordance with said predetermined evaluation formula uses sum of products of the image in each area of said input image and said modified structure recognition template.

9. A template matching program for matching an input image obtained by photographing an inspection object with a template image, wherein the program is embodied in a non-transitory computer readable medium and is for implementing a sequence of operations comprising:

a template area selecting step of selecting a template area from an image for a template as a template original image;

a similar image detecting step of detecting a similar image having a high correlation to the template original image selected by said template area selecting step, from said image for a template;

a difference image forming step of forming a difference image between said template original image and said similar image;

a modified template forming step of modifying said template original image so as to incur a penalty to said similar image during evaluation and forming a modified template, in accordance with said difference image; and a similarity degree evaluating step of calculating said modified template and a partial image in each area of said input image and evaluating a similarity degree of each area, in accordance with a predetermined evaluation formula.

10. A template matching program for matching an input image obtained by photographing an inspection object with a template image, wherein the program is embodied in a non-transitory computer readable medium and is for implementing a sequence of operations comprising:

an area extracting step of separating and extracting a background portion and a structural portion of an image for a template, and using the background portion and structural portion as area extraction data of a template area;

a template area selecting step of selecting a template area from the area extraction data of the template area extracted by said area extracting step;

a similar area extraction data detecting step of detecting similar area extraction data from the image for a template, said similar area extraction data having a high correlation to said area extraction data of the template area selected by said template area selecting step;

a difference area extraction data forming step of forming difference area extraction data between said area extraction data of said template area and said similar area extraction data;

a modified area extraction template forming step of modifying said area extraction data of said template area so as to incur a penalty to said similar area extraction data during evaluation and forming a modified area extraction template, in accordance with said area extraction difference data; and a similarity degree evaluating step of calculating said modified area extraction template and a partial image in each area of said input image and evaluating a similarity degree of each area, in accordance with a predetermined evaluation formula.

11. A template matching program for matching an input image obtained by photographing an inspection object with a template image, wherein the program is embodied in a non-transitory computer readable medium and is for implementing a sequence of operations comprising:

an area extracting step of separating and extracting a background portion and a structural portion of an image for a template, and using the background portion and structural portion as area extraction data of a template area;

a template area selecting step of selecting a template area from the area extraction data of the template area extracted by said area extracting step;

a similar area extraction data detecting step of detecting similar area extraction data from the image for a template, said similar area extraction data having a high correlation to said area extraction data of the template area selected by said template area selecting step;

a difference area extraction data forming step of forming difference area extraction data between said area extraction data of said template area and said similar area extraction data;

a border-added structure recognition data forming step of forming border-added structure recognition data having a border with a predetermined width formed between the background portion and the structural portion of said area extraction data of the template area selected by said template area selecting step;

a modified structure recognition template forming step of modifying said border-added structure recognition data of said template area so as to incur a penalty to said border-added structure recognition data during evaluation and forming a modified structure recognition template, in accordance with said difference area extraction data; and a similarity degree evaluating step of calculating said modified structure recognition template and a partial image in each area of said input image and evaluating a similarity degree of each area, in accordance with a predetermined evaluation formula.

12. A template matching apparatus, containing at least a processor, for matching an input image obtained by photographing an inspection object with a template image, comprising:

template area selecting means for selecting a template area from an image for a template as a template original image;

detecting means for detecting a direction and a movement amount of an area near a predetermined area of said template original image selected by said template area selecting means where a similar morphology appears;

difference image forming means for forming a difference image between an image obtained by moving said image for a template and said template original image, by referring to said direction and said movement amount;

modified template forming means for forming a plurality of difference images by changing a reference method to said direction and said movement amount, and using a synthesized image of said plurality of difference images as a new modified template;

threshold value similarity degree evaluating means for performing template matching in accordance with a predetermined evaluation formula, by using as an input image a threshold value detection image obtained by photographing a same area and a same object as said image for a template, and as a template said modified template, to thereby evaluate of a similarity degree of each area;

threshold value setting means for setting a threshold value by referring to a highest similarity degree and a second highest similarity degree among similarity degrees of areas obtained by said threshold value similarity degree evaluating means;

comparison similarity degree evaluating means for performing template matching to thereby evaluate the similarity degree of each area by using as an input image a comparison image obtained by photographing said inspection object, and as a template said modified template; and judging means for judging whether said comparison image contains an area having a same morphology as said selected template area, in accordance with the similarity degree of each area obtained by said comparison similarity degree evaluating means and said set threshold value.

13. The template matching apparatus according to claim 12, wherein said modified template forming means detects two directions and two movement amounts of areas where a similar morphology appears, and forms said plurality of difference images by referring to said two directions and said two movement amounts.

14. The template matching apparatus according to claim 13, wherein when said modified template forming means detects said two directions and said two movement amounts of areas where a similar morphology appears, a direction along which a highest similarity morphology appears is used as a first direction, a direction, weighing a direction perpendicular to said first direction, along which a next highest similarity morphology appears is used as a second direction, 15. The template matching apparatus according to claim 12, wherein said comparison similarity degree evaluating means uses correlation as said predetermined evaluation formula.

16. A template matching apparatus, containing at least a processor, for matching an input image obtained by photographing an inspection object with a template image, comprising:

template area selecting means for selecting a template area from an image for a template as a template original image;

detecting means for detecting two directions and two movement amounts of areas near a predetermined area of said template original image selected by said template area selecting means where a similar morphology appears;

difference image forming means for forming a difference image between an image obtained by moving said image for a template and said template original image, by referring to said two directions and said two movement amounts detected by said detecting means;

first tentative template forming means for forming a plurality of difference images by changing a reference method to the movement amount in a first direction of said two directions and using a synthesized image of said plurality of difference images as a first tentative template;

second tentative template forming means for forming a plurality of difference images by changing a reference method to the movement amount in a second direction of said two directions and using a synthesized image of said plurality of difference images and said first tentative template as a second tentative template;

first similarity degree evaluating means for performing template matching in accordance with a predetermined evaluation formula, by using as an input image a threshold value detection image obtained by photographing a same area and a same object as said image for a template, and as a template said first tentative template, to thereby evaluate of a similarity degree of each area;

second similarity degree evaluating means for performing template matching in accordance with a predetermined evaluation formula, by using as an input image said threshold value detection image, and as a template said second tentative template, to thereby evaluate of a similarity degree of each area;

first rate calculating means for calculating a first rate having as a denominator a highest similarity degree value and as a numerator a second highest similarity degree value among similarity degree values of areas obtained by said first similarity degree evaluating means;

second rate calculating means for calculating a second rate having as a denominator a highest similarity degree value and as a numerator a second highest similarity degree value among similarity degree values of areas obtained by said second similarity degree evaluating means;

modified template forming means for comparing said first and second ratios, and using a tentative template having a lower ratio as a modified template;

comparison similarity degree evaluating means for performing template matching to thereby evaluate the similarity degree of each area by using as an input image a comparison image obtained by photographing said inspection object, and as a template said modified template; and judging means for judging whether said comparison image contains an area having a same morphology as said selected template area, in accordance with the similarity degree of each area obtained by said comparison similarity degree evaluating means and said set threshold value.

17. A template matching apparatus, containing at least a processor, for matching an input image obtained by photographing an inspection object with a template image, comprising:

template area selecting means for selecting a template area from an image for a template as a template original image;

detecting means for detecting a direction and a movement amount of an area near a predetermined area of said template original image selected by said template area selecting means where a similar morphology appears;

difference image forming means for forming a difference image between an image obtained by moving said image for a template and said template original image, by referring to said direction and said movement amount;

first modified template forming means for forming a plurality of difference images by changing a reference method to said direction and said movement amount, and using a synthesized image of said plurality of difference images as a new first modified template;

second modified template forming means for forming a second modified template by referring to said template original image and said first modified template;

first threshold value similarity degree evaluating means for performing template matching in accordance with a predetermined evaluation formula, by using as an input image a threshold value detection image obtained by photographing a same area and a same object as said image for a template, and as a template said first modified template, to thereby evaluate of a similarity degree of each area;

second threshold value similarity degree evaluating means for performing template matching in accordance with a predetermined evaluation formula, by using as an input image said threshold value detection image obtained by photographing a same area and a same object as said image for a template, and as a template said second modified template, to thereby evaluate of a similarity degree of each area;

threshold value setting means for forming synthesized similarity degrees of similarity degrees of areas obtained by said first and second threshold value similarity degree evaluating means and setting a threshold value by referring to a synthesized highest similarity degree and a synthesized second highest similarity degree among said synthesized similarity degrees;

first comparison similarity degree evaluating means for performing template matching to thereby evaluate the similarity degree of each area by using as an input image a comparison image obtained by photographing said inspection object, and as a template said first modified template;

second comparison similarity degree evaluating means for performing template matching to thereby evaluate the similarity degree of each area by using as an input image said comparison image obtained by photographing said inspection object, and as a template said second modified template; and judging means for calculating a synthesized similarity degree of similarity degrees of areas obtained by both said first and second comparison similarity degree evaluating means, and judging whether said comparison image contains an area having a same morphology as said selected template area, in accordance with the synthesized similarity degree and said threshold value.

18. A template matching method for matching an input image obtained by photographing an inspection object with a template image, wherein:

there are provided template area selecting means, detecting means for detecting a direction and a movement amount of an area where a similar morphology appears, difference image forming means, modified template forming means, threshold value similarity degree evaluating means, threshold value setting means, comparison similarity degree evaluating means, and judging means;

said template area selecting means selects a template area from an image for a template as a template original image;

said detecting means for detecting a direction and a movement amount of an area where a similar morphology appears detects a direction and a movement amount of an area near a predetermined area of said template original image selected by said template area selecting means where a similar morphology appears;

said difference image forming means forms a difference image between an image obtained by moving said image for a template and said template original image, by referring to said direction and said movement amount;

said modified template forming means forms a plurality of difference images by changing a reference method to said direction and said movement amount, and uses a synthesized image of said plurality of difference images as a new modified template;

said threshold value similarity degree evaluating means performs template matching in accordance with a predetermined evaluation formula, by using as an input image a threshold value detection image obtained by photographing a same area and a same object as said image for a template, and as a template said modified template, to thereby evaluate of a similarity degree of each area;

said threshold value setting means sets a threshold value by referring to a highest similarity degree and a second highest similarity degree among similarity degrees of areas obtained by said threshold value similarity degree evaluating means;

said comparison similarity degree evaluating means performs template matching to thereby evaluate the similarity degree of each area by using as an input image a comparison image obtained by photographing said inspection object, and as a template said modified template; and said judging means judges whether said comparison image contains an area having a same morphology as said selected template area, in accordance with the similarity degree of each area obtained by said comparison similarity degree evaluating means and said set threshold value.

19. A template matching method for matching an input image obtained by photographing an inspection object with a template image, wherein:

there are provided template area selecting means, detecting means for detecting two directions and two movement amounts of areas where a similar morphology appears, difference image forming means, first tentative template forming means, second tentative template forming means, first similarity degree evaluating means, second similarity degree evaluating means, first rate calculating means, second rate calculating means, modified template forming means, comparison similarity degree evaluating means, and judging means;

said template area selecting means selects a template area from an image for a template as a template original image;

said detecting means for detecting two directions and two movement amounts of areas where a similar morphology appears detects two directions and two movement amounts of areas near a predetermined area of said template original image selected by said template area selecting means where a similar morphology appears;

said difference image forming means forms a difference image between an image obtained by moving said image for a template and said template original image, by referring to said two directions and said two movement amounts detected by said detecting means;

said first tentative template forming means forms a plurality of difference images by changing a reference method to the movement amount in a first direction of said two directions and using a synthesized image of said plurality of difference images as a first tentative template;

said second tentative template forming means forms a plurality of difference images by changing a reference method to the movement amount in a second direction of said two directions and using a synthesized image of said plurality of difference images and said first tentative template as a second tentative template;

said first similarity degree evaluating means performs template matching in accordance with a predetermined evaluation formula, by using as an input image a threshold value detection image obtained by photographing a same area and a same object as said image for a template, and as a template said first tentative template, to thereby evaluate of a similarity degree of each area;

said second similarity degree evaluating means performs template matching in accordance with a predetermined evaluation formula, by using as an input image said threshold value detection image, and as a template said second tentative template, to thereby evaluate of a similarity degree of each area;

said first rate calculating means calculates a first rate having as a denominator a highest similarity degree value and as a numerator a second highest similarity degree value among similarity degree values of areas obtained by said first similarity degree evaluating means;

said second rate calculating means calculates a second rate having as a denominator a highest similarity degree value and as a numerator a second highest similarity degree value among similarity degree values of areas obtained by said second similarity degree evaluating means;

said modified template forming means compares said first and second ratios, and uses a tentative template having a lower ratio as a modified template;

said comparison similarity degree evaluating means performs template matching to thereby evaluate the similarity degree of each area by using as an input image a comparison image obtained by photographing said inspection object, and as a template said modified template; and said judging means judges whether said comparison image contains an area having a same morphology as said selected template area, in accordance with the similarity degree of each area obtained by said comparison similarity degree evaluating means and said set threshold value.

20. A template matching method for matching an input image obtained by photographing an inspection object with a template image, wherein:

there are provided template area selecting means, detecting means for detecting a direction and a movement amount of an area where a similar morphology appears, difference image forming means, first modified template forming means, second modified template forming means, first threshold value similarity degree evaluating means, second threshold value similarity degree evaluating means, threshold value setting means, first comparison similarity degree evaluating means, second comparison similarity degree evaluating means, and judging means;

said template area selecting means selects a template area from an image for a template as a template original image; said detecting means for detecting a direction and a movement amount of an area where a similar morphology appears detects a direction and a movement amount of an area near a predetermined area of said template original image selected by said template area selecting means where a similar morphology appears;

said difference image forming means forms a difference image between an image obtained by moving said image for a template and said template original image, by referring to said direction and said movement amount;

said first modified template forming means forms a plurality of difference images by changing a reference method to said direction and said movement amount, and uses a synthesized image of said plurality of difference images as a new first modified template;

said second modified template forming means forms a second modified template by referring to said template original image and said first modified template;

said first threshold value similarity degree evaluating means performs template matching in accordance with a predetermined evaluation formula, by using as an input image a threshold value detection image obtained by photographing a same area and a same object as said image for a template, and as a template said first modified template, to thereby evaluate of a similarity degree of each area;

said second threshold value similarity degree evaluating means performs template matching in accordance with a predetermined evaluation formula, by using as an input image said threshold value detection image obtained by photographing a same area and a same object as said image for a template, and as a template said second modified template, to thereby evaluate of a similarity degree of each area;

said threshold value setting means forms synthesized similarity degrees of similarity degrees of areas obtained by said first and second threshold value similarity degree evaluating means and sets a threshold value by referring to a synthesized highest similarity degree and a synthesized second highest similarity degree among said synthesized similarity degrees;

said first comparison similarity degree evaluating means performs template matching to thereby evaluate the similarity degree of each area by using as an input image a comparison image obtained by photographing said inspection object, and as a template said first modified template;

said second comparison similarity degree evaluating means performs template matching to thereby evaluate the similarity degree of each area by using as an input image said comparison image obtained by photographing said inspection object, and as a template said second modified template; and said judging means calculates a synthesized similarity degree of similarity degrees of areas obtained by both said first and second comparison similarity degree evaluating means, and judges whether said comparison image contains an area having a same morphology as said selected template area, in accordance with the synthesized similarity degree and said threshold value.

21. A template matching program for matching an input image obtained by photographing an inspection object with a template image, wherein the program is embodied in a non-transitory computer readable medium and is for implementing a sequence of operations comprising:

a template area selecting step of selecting a template area from an image for a template as a template original image;

a detecting step of detecting a direction and a movement amount of an area near a predetermined area of said template original image selected by said template area selecting step where a similar morphology appears;

a difference image forming step of forming a difference image between an image obtained by moving said image for a template and said template original image, by referring to said direction and said movement amount;

a modified template forming step of forming a plurality of difference images by changing a reference method to said direction and said movement amount, and using a synthesized image of said plurality of difference images as a new modified template;

a threshold value similarity degree evaluating step of performing template matching in accordance with a predetermined evaluation formula, by using as an input image a threshold value detection image obtained by photographing a same area and a same object as said image for a template, and as a template said modified template, to thereby evaluate of a similarity degree of each area;

a threshold value setting step of setting a threshold value by referring to a highest similarity degree and a second highest similarity degree among similarity degrees of areas obtained by said threshold value similarity degree evaluating step;

a comparison similarity degree evaluating step of performing template matching to thereby evaluate the similarity degree of each area by using as an input image a comparison image obtained by photographing said inspection object, and as a template said modified template; and a judging step of judging whether said comparison image contains an area having a same morphology as said selected template area, in accordance with the similarity degree of each area obtained by said comparison similarity degree evaluating step and said set threshold value.

22. The template matching program according to claim 21, wherein said modified template forming means detects two directions and two movement amounts of areas where a similar morphology appears, and forms said plurality of difference images by referring to said two directions and said two movement amounts.

23. The template matching program according to claim 22, wherein when said modified template forming means detects said two directions and said two movement amounts of areas where a similar morphology appears, a direction along which a highest similarity morphology appears is used as a first direction, a direction, weighing a direction perpendicular to said first direction, along which a next highest similarity morphology appears is used as a second direction.

24. The template matching apparatus according to claim 21, wherein said comparison similarity degree evaluating means uses correlation as said predetermined evaluation formula.

25. A template matching program for matching an input image obtained by photographing an inspection object with a template image, wherein the program is embodied in a non-transitory computer readable medium and is for implementing a sequence of operations comprising:

a template area selecting step of selecting a template area from an image for a template as a template original image;

a detecting step of detecting two directions and two movement amounts of areas near a predetermined area of said template original image selected by said template area selecting step where a similar morphology appears;

a difference image forming step of forming a difference image between an image obtained by moving said image for a template and said template original image, by referring to said two directions and said two movement amounts detected by said detecting step;

a first tentative template forming step of forming a plurality of difference images by changing a reference method to the movement amount in a first direction of said two directions and using a synthesized image of said plurality of difference images as a first tentative template;

a second tentative template forming step of forming a plurality of difference images by changing a reference method to the movement amount in a second direction of said two directions and using a synthesized image of said plurality of difference images and said first tentative template as a second tentative template;

a first similarity degree evaluating step of performing template matching in accordance with a predetermined evaluation formula, by using as an input image a threshold value detection image obtained by photographing a same area and a same object as said image for a template, and as a template said first tentative template, to thereby evaluate of a similarity degree of each area;

a second similarity degree evaluating step of performing template matching in accordance with a predetermined evaluation formula, by using as an input image said threshold value detection image, and as a template said second tentative template, to thereby evaluate of a similarity degree of each area;

a first rate calculating step of calculating a first rate having as a denominator a highest similarity degree value and as a numerator a second highest similarity degree value among similarity degree values of areas obtained by said first similarity degree evaluating step;

a second rate calculating step of calculating a second rate having as a denominator a highest similarity degree value and as a numerator a second highest similarity degree value among similarity degree values of areas obtained by said second similarity degree evaluating step;

a modified template forming step of comparing said first and second ratios, and using a tentative template having a lower ratio as a modified template;

a comparison similarity degree evaluating step of performing template matching to thereby evaluate the similarity degree of each area by using as an input image a comparison image obtained by photographing said inspection object, and as a template said modified template; and a judging step of judging whether said comparison image contains an area having a same morphology as said selected template area, in accordance with the similarity degree of each area obtained by said comparison similarity degree evaluating step and said set threshold value.

26. A template matching program for matching an input image obtained by photographing an inspection object with a template image, wherein the program is embodied in a non-transitory computer readable medium and is for implementing a sequence of operations comprising:

a template area selecting step of selecting a template area from an image for a template as a template original image;

a detecting step of detecting a direction and a movement amount of an area near a predetermined area of said template original image selected by said template area selecting step where a similar morphology appears;

a difference image forming step of forming a difference image between an image obtained by moving said image for a template and said template original image, by referring to said direction and said movement amount;

a first modified template forming step of forming a plurality of difference images by changing a reference method to said direction and said movement amount, and using a synthesized image of said plurality of difference images as a new first modified template;

a second modified template forming step of forming a second modified template by referring to said template original image and said first modified template;

a first threshold value similarity degree evaluating step of performing template matching in accordance with a predetermined evaluation formula, by using as an input image a threshold value detection image obtained by photographing a same area and a same object as said image for a template, and as a template said first modified template, to thereby evaluate of a similarity degree of each area;

a second threshold value similarity degree evaluating step of performing template matching in accordance with a predetermined evaluation formula, by using as an input image said threshold value detection image obtained by photographing a same area and a same object as said image for a template, and as a template said second modified template, to thereby evaluate of a similarity degree of each area;

a threshold value setting step of forming synthesized similarity degrees of similarity degrees of areas obtained by said first and second threshold value similarity degree evaluating means and setting a threshold value by referring to a synthesized highest similarity degree and a synthesized second highest similarity degree among said synthesized similarity degrees;

a first comparison similarity degree evaluating step of performing template matching to thereby evaluate the similarity degree of each area by using as an input image a comparison image obtained by photographing said inspection object, and as a template said first modified template;

a second comparison similarity degree evaluating step of performing template matching to thereby evaluate the similarity degree of each area by using as an input image said comparison image obtained by photographing said inspection object, and as a template said second modified template; and a judging step of calculating a synthesized similarity degree of similarity degrees of areas obtained by both said first and second comparison similarity degree evaluating means, and judging whether said comparison image contains an area having a same morphology as said selected template area, in accordance with the synthesized similarity degree and said threshold value.

* * * * *